(12) United States Patent
Lynch-Branzoi et al.

(10) Patent No.: US 11,479,653 B2
(45) Date of Patent: Oct. 25, 2022

(54) USE OF GRAPHENE-POLYMER COMPOSITES TO IMPROVE BARRIER RESISTANCE OF POLYMERS TO LIQUID AND GAS PERMEANTS

(71) Applicant: Rutgers, The State University of New Jersey, New Brunswick, NJ (US)

(72) Inventors: Jennifer K. Lynch-Branzoi, Belle Mead, NJ (US); Thomas J. Nosker, Stockton, NJ (US); Bernard H. Kear, Whitehouse Station, NJ (US); Charles T. Chang, Wayne, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 0 days.

(21) Appl. No.: 16/961,969

(22) PCT Filed: Jan. 16, 2019

(86) PCT No.: PCT/US2019/013754
§ 371 (c)(1),
(2) Date: Jul. 14, 2020

(87) PCT Pub. No.: WO2019/143662
PCT Pub. Date: Jul. 25, 2019

(65) Prior Publication Data
US 2020/0362137 A1    Nov. 19, 2020

Related U.S. Application Data

(60) Provisional application No. 62/617,936, filed on Jan. 16, 2018.

(51) Int. Cl.
*C08K 3/04* (2006.01)
*B32B 27/20* (2006.01)
(Continued)

(52) U.S. Cl.
CPC .............. *C08K 3/042* (2017.05); *B32B 9/045* (2013.01); *B32B 15/08* (2013.01); *B32B 27/08* (2013.01);
(Continued)

(58) Field of Classification Search
CPC .. C08K 3/042; C08K 2201/008; B32B 9/045; B32B 15/08; B32B 27/10; B32B 27/20;
(Continued)

(56) References Cited

U.S. PATENT DOCUMENTS

| 5,298,214 A | 3/1994 | Morrow et al. |
| 5,789,477 A | 8/1998 | Nosker et al. |

(Continued)

FOREIGN PATENT DOCUMENTS

| CA | 2909715 A1 | 10/2014 |
| CA | 2888865 C | 5/2020 |

(Continued)

OTHER PUBLICATIONS

Lu, et al.: "Preparation of Polyethylene/Expanded Graphite Intercalated Composites by In-situ Expanding Method", China Plastics, Jul. 31, 2009, vol. 23, No. 7, pp. 49-54.
(Continued)

*Primary Examiner* — Walter Aughenbaugh
(74) *Attorney, Agent, or Firm* — Fox Rothschild LLP

(57) ABSTRACT

A packaging material comprising a graphene-reinforced polymer matrix composite (G-PMC) is disclosed. The packaging material has improved barrier resistance to gas and liquid permeants. Also disclosed is a method of improving barrier resistance of a polymer to a permeant, the method comprising forming a graphene-reinforced polymer matrix composite within the polymer. The packaging material may be used for packaging food, drug, perfume, etc. and to make various containers.

11 Claims, 16 Drawing Sheets

(51) Int. Cl.
  *B32B 9/04* (2006.01)
  *B32B 15/08* (2006.01)
  *B32B 27/08* (2006.01)
  *B32B 27/10* (2006.01)

(52) U.S. Cl.
  CPC .............. *B32B 27/10* (2013.01); *B32B 27/20* (2013.01); *B32B 2260/025* (2013.01); *B32B 2260/046* (2013.01); *B32B 2264/108* (2013.01); *B32B 2307/7242* (2013.01); *B32B 2307/7265* (2013.01); *B32B 2439/40* (2013.01); *C08K 2201/008* (2013.01)

(58) Field of Classification Search
  CPC ........ B32B 2260/025; B32B 2260/046; B32B 2264/108; B32B 2307/7242; B32B 2307/7265; B32B 2439/40
  See application file for complete search history.

(56) References Cited

U.S. PATENT DOCUMENTS

| | | | |
|---|---|---|---|
| 5,916,932 | A | 6/1999 | Nosker et al. |
| 6,042,765 | A | 3/2000 | Sugahara et al. |
| 6,962,431 | B1 | 11/2005 | Luker |
| 7,465,605 | B2 | 12/2008 | Raravikar et al. |
| 7,745,528 | B2 | 6/2010 | Prud'Homme et al. |
| 7,906,053 | B1 | 3/2011 | Torkelson et al. |
| 8,167,190 | B1 | 5/2012 | Bullock et al. |
| 8,303,876 | B1 | 11/2012 | Torkelson et al. |
| 8,734,696 | B1 | 5/2014 | Torkelson et al. |
| 8,871,826 | B2 * | 10/2014 | Butzloff ................. B01J 35/006 588/317 |
| 9,139,440 | B2 | 9/2015 | Felisari et al. |
| 9,896,565 | B2 * | 2/2018 | Nosker .................... C08J 3/201 |
| 10,253,154 | B2 * | 4/2019 | Nosker .................... C08K 3/04 |
| 10,329,391 | B2 * | 6/2019 | Nosker .................... C01B 32/19 |
| 11,098,175 | B2 * | 8/2021 | Nosker .................... C08J 5/005 |
| 11,174,366 | B2 * | 11/2021 | Nosker .................... C08L 79/08 |
| 11,225,558 | B2 * | 1/2022 | Nosker .................... C01B 32/19 |
| 2005/0186378 | A1 | 8/2005 | Bhatt |
| 2006/0047052 | A1 | 3/2006 | Barrera et al. |
| 2006/0062986 | A1 | 3/2006 | Magario et al. |
| 2007/0099792 | A1 | 5/2007 | Khabashesku et al. |
| 2008/0279756 | A1 | 11/2008 | Zhamu et al. |
| 2009/0087661 | A1 | 4/2009 | Eder |
| 2010/0147188 | A1 | 6/2010 | Mamak et al. |
| 2010/0317790 | A1 | 12/2010 | Jang et al. |
| 2011/0017955 | A1 | 1/2011 | Zhamu et al. |
| 2011/0114189 | A1 | 5/2011 | Crain et al. |
| 2011/0133134 | A1 | 6/2011 | Varma et al. |
| 2011/0143058 | A1 | 6/2011 | Nosker et al. |
| 2011/0186789 | A1 | 8/2011 | Samulski et al. |
| 2011/0260116 | A1 | 10/2011 | Plee et al. |
| 2012/0065299 | A1 | 3/2012 | Lukehart et al. |
| 2012/0068124 | A1 | 3/2012 | Dickinson et al. |
| 2012/0142832 | A1 | 6/2012 | Varma et al. |
| 2012/0264836 | A1 | 10/2012 | Felisari et al. |
| 2012/0328946 | A1 | 12/2012 | Bosnyak et al. |
| 2013/0018204 | A1 | 1/2013 | Jeon et al. |
| 2013/0072613 | A1 | 3/2013 | Miltner et al. |
| 2013/0295367 | A1 | 11/2013 | Compton et al. |
| 2014/0042390 | A1 | 2/2014 | Gruner et al. |
| 2014/0058046 | A1 | 2/2014 | Sawa et al. |
| 2014/0083752 | A1 | 3/2014 | Walczak et al. |
| 2014/0094541 | A1 | 4/2014 | Shah et al. |
| 2014/0141257 | A1 | 5/2014 | Ranade et al. |
| 2014/0183415 | A1 | 7/2014 | Song |
| 2015/0267030 | A1 | 9/2015 | Nosker et al. |
| 2016/0009561 | A1 | 1/2016 | Coleman et al. |
| 2016/0332136 | A1 | 11/2016 | Zhang et al. |
| 2017/0207000 | A1 | 7/2017 | Prestayko et al. |
| 2017/0218141 | A1 | 8/2017 | Nosker et al. |
| 2017/0352868 | A1 | 12/2017 | Zhamu et al. |

FOREIGN PATENT DOCUMENTS

| | | |
|---|---|---|
| CN | 101817516 A | 9/2010 |
| CN | 103842422 A | 6/2014 |
| CN | 104884243 A | 9/2015 |
| CN | 104945659 A | 9/2015 |
| CN | 104945694 A | 9/2015 |
| CN | 105324241 A | 2/2016 |
| EP | 2287244 A1 | 2/2011 |
| EP | 2612889 A1 | 7/2013 |
| JP | H08-053571 A | 2/1996 |
| JP | 2003-138145 A | 5/2003 |
| JP | 2003-531802 A | 10/2003 |
| JP | 2007-524735 A | 8/2007 |
| JP | 2008-266577 A | 11/2008 |
| JP | 2009-542839 A | 12/2009 |
| JP | 2011-038078 A | 2/2011 |
| JP | 2011-513167 A | 4/2011 |
| JP | 2012500179 A | 1/2012 |
| JP | 2012-136712 A | 7/2012 |
| JP | 2013018825 A | 1/2013 |
| JP | 2013-507477 A | 3/2013 |
| JP | 2013-233790 A | 11/2013 |
| JP | 2015537075 A | 12/2015 |
| JP | 2016-509122 A | 3/2016 |
| JP | 2016519191 A | 6/2016 |
| JP | 6393743 B2 | 9/2018 |
| JP | 2018138667 A | 9/2018 |
| JP | 2018-158453 A | 10/2018 |
| JP | 2019002021 A | 1/2019 |
| JP | 6633703 B2 | 1/2020 |
| KR | 10-2011-0018024 A | 2/2011 |
| KR | 10-2012-0009978 A | 2/2012 |
| TW | 201915053 A | 4/2019 |
| WO | 07145918 A2 | 12/2007 |
| WO | 2009018204 A1 | 2/2009 |
| WO | 2009029984 A1 | 3/2009 |
| WO | 2010107763 | 9/2010 |
| WO | 2010115173 A1 | 10/2010 |
| WO | 2011/042800 A1 | 4/2011 |
| WO | 2012013303 A1 | 2/2012 |
| WO | 2012020099 A1 | 2/2012 |
| WO | 2012/049121 | 4/2012 |
| WO | 2012/133303 | 10/2012 |
| WO | 2013/058181 A1 | 4/2013 |
| WO | 2014/062226 A1 | 4/2014 |
| WO | 20140172619 A1 | 10/2014 |
| WO | 2015044478 | 4/2015 |
| WO | 2016018995 A1 | 2/2016 |
| WO | 16106312 A2 | 6/2016 |

OTHER PUBLICATIONS

Wakabayashi, et al.: "Polymer-Graphite Nanocomposites: Effective Dispersion and Major Property Enhancement via Solid-State Shear Pulverization", Macromolecules, American Chemical Society, Feb. 29, 2008, vol. 41, No. 6, pp. 1905-1908, XP-002743181.

Bao, et al.: "Preparation of Graphene by Pressurized Oxidation and Multiplex Reduction and its Polymer Nanocomposites by Masterbatch-Based Melt Blending", Journal of Materials Chemistry, Jan. 1, 2012, vol. 22, No. 13, pp. 6088-6096.

Randcastle Extrusion Systems, Inc., Nov. 1, 2006, XP055279030, retrieved from the Internet: URL: http://www.feedscrewdesigns.com/ubb/Forum1/HTML/000521.html [retrieved on Jun. 9, 2016], pp. 1-3.

Eda, et al: Chemically Derived Graphene Oxide: Towards Large-Area Thin-Film Electronics and Optoelectronics; Advanced Materials, 2010, vol. 22, pp. 2392-2415.

Novoselov et al., "Electric Field Effect in Atomically Thin Carbon Films," Science (2004); 306:666-669.

Lu, et al., "Preparation of Polyethylene/Expanded Graphite Intercalated Composites by In-situ Expanding Method," China Plastics (Jul. 2009), vol. 23, No. 7, pp. 49-54.

(56) References Cited

OTHER PUBLICATIONS

Choudhary, et al.: "Polymer/Carbon Nanotube Nanocomposites", Aug. 17, 2011, Chapter 4, pp. 65-90, Retrieved from the Internet: <http://www.intechopen.com/books/carbon-nanotubes-polymer-nanocomposites/polymer-carbon-nanotube-nanocomposites>.
Jonathan N. Coleman: "Liquid Exfoliation of Defect-Free Graphene", Accounts of Chemical Research, 2013, vol. 46, No. 1, pp. 14-22.
Xie, et al "Boron Nitride Nanosheets As New Barrier Additive For Plastic Packaging", New/Nano Materials. Retrieved from the Internet <URL: https://www.tcd.ie./Physics/research/groups/1d-nanostructures/files/posters/NewNano%20-%2034_poster_Shaobo%20Xie.pdf>, Publication [unknown, no earlier than 2013].
Nixon, A.: "Understanding Graphene—Part 1", Feb. 4, 2016. [retrieved Nov. 18, 2016]. Retrieved from the Internet: <http://investorintel.com/technology-metals-intel/understanding-graphene-part-1-graphene-and-graphite/>.
Thomas Swan; "Elicarb Graphene Epoxy Dispersion", Advanced Materials, Publication [unknown].
Paton, et al: "Scale-up of Liquid Exfoliation of Graphene", Thomas Swan Advanced Materials, Retrieved from the Internet: URL: https://www.tcd.ie/Physics/research/groups/1d-nanostructures/files/posters/ChemOnTubes%20Poster%20KP.pdf>. Publication [unknown, not earlier than 2014].
Paton, et al: "Scalable Production of Large Quantities of Defect-Free Few-Layer Graphene by Shear Exfoliation in Liquids", Nature Materials, Jun. 2014, vol. 13, pp. 624-630.
Diez-Pascual, et al: "High-Performance Nanocomposites Based on Polyetherketones", Progress In Materials Science, Pergamon Press, GB, vol. 57, No. 7, Mar. 4, 2012 (Mar. 4, 2012), pp. 1106-1190, XP028514432, ISSN: 0079-6425, DOI: 10.1016/J.PMATSCI.2012.03.003 [retrieved on Mar. 29, 2012].
Rangari et al: "Alignment of Carbon Nanotubes and Reinforcing Effects in Nylon-6 Polymer Composite Fibers", Nanotechnology Instititute of Physics Publishing, GB, vol. 19, No. 24, Jun. 18, 2008 (Jun. 18, 2008), pp. 1-9, XP002679937, ISSN: 0957-4484, DOI: DOI:10.1088/0957-4484/19/24/245703 [retrieved on May 12, 2008].
Peeterbroeck, et al: "How Carbon Nanotube Crushing Can Improve Flame Retardant Behaviour in Polymer Nanocomposites?", Macromolecular Rapid Communications, vol. 28, No. 3, Feb. 2, 2007 (Feb. 2, 2007), pp. 260-264, XP055669652, DE, ISSN: 1022-1336, DOI: 10.1002/marc.200600614.
Tewatia, et al: "High Shear Melt-Processing of Polyetherethereketone Enhanced Polysulfone Immiscible Polymer Blends", Antec Orlando, The Plastics Technology Conference, Orange County Convention Center, Orlando, FL, May 7-10, 2018.
Tewatia, et al: "Multi-Scale Carbon (Micro/Nano) Fiber Reinforcement of Polyetheretherketone Using High Shear Melt-Processing", Fibers, 2017, 5, 32; doi:10.3390/fib5030032, pp. 1-11.
Lynch, et al: Applying AImmiscible Polymer Blend Concepts to Achieve an Amplified Orientation and Property Effect on Multi-scale Reinforced Compositions, Sep. 2012.
Luker, K., "Summary Results of a Novel Single Screw Compounder", SPE-ANTEC Technical Papers, 2007, pp. 459-463.
Luker, K., "Randcastle Extrusion Systems, Inc—Microtruder Brochure", III, 2008.
Lynch, et al: "Development of Novel One-Step Hybrid Processing", SPE-ANTEC Technical Papers, 2010, pp. 2076-2080.
Jordhamo, et al: "Phase Continuity and Inversion in Polymer Blends and Simultaneous Interpenetrating Networks", Polymer Engineering and Science, vol. 26, No. 8, Apr. 1986, pp. 517-524.
Whieb, Nofel Z: "Processing, Characteristics and Properties of NT-Enhanced PA 66", Published May 2, 2018, A dissertation submitted to the Graduate School—New Brunswick, Rutgers, The State University of New Jersey, Oct. 2017.
Paton, et al: Scalable Production of Large Quantities of Defect-Free, Few-Layer Graphene by Shear Exfoliation in Liquids, Nature Mater, 13, Apr. 20, 2014 (Apr. 20, 2014) retrieved via the internet on Dec. 9, 2019 (Dec. 9, 2019) <url: https://www.nature.com/articles/nmat3944> Abstract.

\* cited by examiner

A    B

A

B

C

A

B

USE OF GRAPHENE-POLYMER COMPOSITES TO IMPROVE BARRIER RESISTANCE OF POLYMERS TO LIQUID AND GAS PERMEANTS

CROSS-REFERENCE TO RELATED APPLICATION

The present application is a U.S. National Phase of International Application No. PCT/US19/13754, filed Jan. 16, 2019, which claims priority under 35 U.S.C. § 119(e) to U.S. Provisional Patent Application No. 62/617,936, filed Jan. 16, 2018, the entire disclosure of which is incorporated herein by reference for all purposes.

TECHNICAL FIELD

This disclosure relates to use of graphene-polymer composites to improve barrier resistance of polymers to liquid and gas permeants.

BACKGROUND OF THE INVENTION

Polymer compositions are being increasingly used in a wide range of areas that have traditionally employed the use of other materials, such as metals. Polymers possess a number of desirable physical properties, are lightweight, and inexpensive. In addition, many polymer materials may be formed into a number of various shapes and forms and exhibit significant flexibility in the forms that they assume, and may be used as coatings, dispersions, extrusion and molding resins, pastes, powders, and the like.

Plastics are versatile materials which have been used in many different ways in our daily life. It can be shaped into flexible films or converted into many forms. A single layer film can be used as a wrapping material. For example, a Saran film is used as a food wrapping material. Polypropylene (PP) stretch film is used to wrap around the shipping boxes on the pallets. A polyethylene (PE) film can be converted into Ziploc bags. A combination of multiple layers of plastics has been developed for different applications. For example, a sturdy film consisting of multiple layers of films is converted into garbage bags. An oil-resistant film contains multiple layers of plastic materials, with the inner plastic layer having high resistance to oil and the outer plastic layers providing the physical strength. A thick film, made of an expanded foam layer and a top decorative layer, can be used for cosmetic bags.

Plastic materials have different degrees of barrier property to gases and liquids. A material with a high barrier property to oxygen may have a very low permeation rate for oxygen to permeate through. For example, Saran has a low oxygen permeation rate and is widely used in food packaging to extend food shelf life. Polyethylene terephthalate (PET or PETE) has been used for soda bottles due to its low carbon dioxide permeation rate. Multilayered containers have been developed to obtain low permeation rates for oxygen, water moisture, fragrance oil, etc. Also, multilayered film utilizing the different properties of each layer is used in waterproofing applications, such as roofing material and foundation underground waterproofing material.

Different plastic materials have different chemical resistant properties. Therefore, a plastic material that is compatible with one product may be incompatible with another product. However, even if it is compatible with a product for its chemical properties, it can still be unsuitable due to poor barrier property. For example, high-density polyethylene (HDPE) is compatible with soda beverages, but it has poor barrier property against carbon dioxide. The soda will lose the gas and become sugar water drinks. In the meantime, HDPE bottles are used for many products, including shampoo, detergent, water, etc. PP is compatible with nail enamel, but it has poor barrier property against organic solvents. As a result, the nail enamel will dry up before it reaches consumers. Also, under the sunlight or exposure to UV, plastic materials undergo degradation over time and lose their original property. As a result, the durability of the product can be significantly reduced.

Due to the limitations of plastic materials described above, there remains a need for a new class of material with improved mechanical properties, durability, and barrier resistance to gases, liquids, and UV light.

SUMMARY OF THE INVENTION

This disclosure addresses this need by providing a new and innovative plastic material comprising graphene nanoflakes (GNFs) with improved barrier property, mechanic properties, and durability.

In one aspect, the present disclosure provides a packaging material comprising a graphene-reinforced polymer matrix composite (G-PMC) with improved barrier resistance to a permeant. In yet another aspect, the present disclosure provides a packaging material comprising from about 2 wt % to about 60 wt %, of particles selected from the group consisting of single-layer and multi-layer graphene nanoparticles less than 10 nanometers thick along a c-axis direction, partially exfoliated multi-layer graphene nanoparticles from 10 to 1,000 nanometers thick along the c-axis direction, graphite microparticles, and combinations of two or more thereof, wherein from about 5 wt % to less than about 95 wt % of the particles are single-layer graphene nanoparticles less than 10 nanometers thick along the c-axis direction, multi-layer graphene nanoparticles less than 10 nanometers thick along the c-axis direction, partially exfoliated multi-layer graphene nanoparticles from 10 to 1,000 nanometers thick along the c-axis direction, or a combination of two or more thereof.

In some embodiments, the graphene-reinforced polymer matrix composite comprises between about 0.1 wt % and about 30 wt % of graphene. In some embodiments, the graphene-reinforced polymer matrix composite comprises between about 1 wt % and about 10 wt % of graphene. In some embodiments, the graphene-reinforced polymer matrix composite comprises between about 5 wt % and about 50 wt % of graphene. In some embodiments, the graphene-reinforced polymer matrix composite comprises between about 10 wt % and about 30 wt % of graphene.

In some embodiments, the graphene-reinforced polymer matrix composite comprises a thermoplastic polymer selected from the group consisting of acrylics, polymethylmethacrylate (PMMA), acrylonitrile, acrylonitrile butadiene styrene (ABS) co-polymers, polyarylate, polyacrylonitriles (PAN), polyamideimide (PAI), aromatic polysulfones, aromatic thermoplastic polyesters, liquid crystal polymers, polyarylether-ketones, polycarbonates (PC), polydimethyl siloxane (PDMS), polyaryletherketones (PAEK), polyetherether-ketones (PEEK), polyethylene naphthalene dicarboxylate (PEN), polyetherimides (PEI), polyetherketones (PEK), polyethylene, Polyethersulfone, polysulphone (PSul), polyethylene sulfide (PES), polyethylene terephthalate (PET or PETE), low-density polyethylene (LDPE), high-density polyethylene (HDPE), polyglycolic acid (PGA), polylactic acids (PLA), polylactic-glycolic acid copolymers (PLGA), polyoxymethylene plastic (POM/Acetal), polyphenylene ethers, polyphenylene oxide (PPO), polyphenylene sulfides (PPS), polypropylene (PP), polystyrene (PS), polysulfones (PSU), polytetrafluoro-ethylene (PTFE/TEFLON®), polyvinylchloride (PVC), polyvinylidene fluoride (PVDF), thermoplastic elastomers, polyimides, thermosplastic polyimides, ultra-highmolecular-weight polyethylene (UHMWPE), natural or synthetic rubber, Polyamides (PA), nylons, aliphatic polyamides, semi-aromatic polyamides, aromatic polyamides, polyamide-11 (nylon-11), polyamide-12 (nylon-12), polyamide-4,6, polyamide-6 (nylon-6), polyamide-6,10, polyamide-6,12, polyimide-6,6 (nylon-6,6), polyamide-6,9, polyamides (PA), and the mixtures of two or more thereof.

In some embodiments, the graphene-reinforced polymer matrix composite comprises about 50 wt % of a total composite weight of particles selected from the group consisting of graphite microparticles, single-layer graphene nanoparticles, multi-layer graphene nanoparticles, and combinations of two or more thereof. In some embodiments, the particles comprise single- and/or multi-layer graphene nanoparticles less than 10 nanometers thick along the c-axis direction. In some embodiments, the thermoplastic polymer is inter-molecularly cross-linked by torn single- and/or multi-layer graphene sheets having carbon atoms with reactive bonding sites on the torn edges of said sheets.

In another aspect, the packaging material comprises a graphene-reinforced polymer matrix composite which is prepared by (a) distributing graphite microparticles into a molten thermoplastic polymer phase, wherein at least 50 wt % of the graphite in the graphite microparticles consists of multilayer graphite crystals between 1.0 and 1000 microns thick along a c-axis direction; and (b) applying a succession of shear strain events to the molten polymer phase so that the shear stress within said molten polymer phase is equal to or greater than the Interlayer Shear Strength (ISS) of said graphite microparticles and said molten polymer phase exfoliates the graphite successively with each event until said graphite is at least partially exfoliated to form a distribution in the molten polymer phase of single- and multi-layer graphene nanoparticles less than 10 nanometers thick along the c-axis direction.

In some embodiments, the packaging material comprises one or more layers of the graphene-reinforced polymer matrix composite. In some embodiments, the packaging material further comprises one or more layers of material which comprises paper. In some embodiments, the packaging material comprises one or more layers of material which comprises plastic. In some embodiments, the packaging material comprises one or more layers of material which comprises metal. In some embodiments, the packaging material comprises one or more layers of foil. In some embodiments, the packaging material comprises one or more layers of flexible ceramic materials.

In yet another aspect, the present disclosure provides a method of improving barrier resistance of a polymeric material to a permeant. The method includes forming a graphene-reinforced thermoplastic polymer matrix composite within the thermoplastic polymer. The method of forming the graphene-reinforced polymer matrix composite within the polymer includes (a) distributing graphite microparticles into a molten thermoplastic polymer phase of the polymer, wherein at least 50 wt % of the graphite in the graphite microparticles consists of multilayer graphite crystals between 1.0 and 1000 microns thick along a c-axis direction; and (b) applying a succession of shear strain events to the molten polymer phase so that the shear stress within said molten polymer phase is equal to or greater than the Interlayer Shear Strength (ISS) of said graphite microparticles and said molten polymer phase exfoliates the graphite successively with each event until said graphite is at least partially exfoliated to form a distribution in the molten polymer phase of single- and multi-layer graphene nanoparticles less than 10 nanometers thick along the c-axis direction.

In some embodiments, the succession of shear strain events is applied until at least 50 wt % by weight of the graphite is exfoliated to form a distribution in the molten polymer phase of single- and multi-layer graphene nanoparticles less than 10 nanometers thick along the c-axis direction. In some embodiments, the succession of shear strain events is applied until at least 90% by weight of the graphite is exfoliated to form a distribution in the molten polymer phase of single- and multi-layer graphene nanoparticles less than 10 nanometers thick along the c-axis direction. In some embodiments, the succession of shear strain events is applied until at least 80% by weight of the graphite is exfoliated to form a distribution in the molten polymer phase of single- and multi-layer graphene nanoparticles less than 10 nanometers thick along the c-axis direction. In some embodiments, the succession of shear strain events is applied until at least 75% by weight of the graphite is exfoliated to form a distribution in the molten polymer phase of single- and multi-layer graphene nanoparticles less than 10 nanometers thick along the c-axis direction. In some embodiments, the succession of shear strain events is applied until at least 70% by weight of the graphite is exfoliated to form a distribution in the molten polymer phase of single- and multi-layer graphene nanoparticles less than 10 nanometers thick along the c-axis direction. In some embodiments, the succession of shear strain events is applied until at least 60% by weight of the graphite is exfoliated to form a distribution in the molten polymer phase of single- and multi-layer graphene nanoparticles less than 10 nanometers thick along the c-axis direction.

In some embodiments, the polymer is selected from the group consisting of acrylics, polymethyl-methacrylate (PMMA), acrylonitrile, acrylonitrile butadiene styrene (ABS) co-polymers, polyarylate, polyacrylonitriles (PAN), polyamideimide (PAI), aromatic polysulfones, aromatic thermoplastic polyesters, liquid crystal polymers, polyaryl-ether-ketones, polycarbonates (PC), polydimethyl siloxane (PDMS), polyaryletherketones (PAEK), polyetherether-ketones (PEEK), polyethylene naphthalene dicarboxylate (PEN), polyetherimides (PEI), polyetherketones (PEK), polyethylene, Polyethersulfone, polysulphone (PSul), poly-ethylene sulfide (PES), polyethylene terephthalate (PET or PETE), low-density polyethylene (LDPE), high-density polyethylene (HDPE), polyglycolic acid (PGA), polylactic acids (PLA), polylactic-glycolic acid copolymers (PLGA), polyoxymethylene plastic (POM/Acetal), polyphenylene ethers, polyphenylene oxide (PPO), polyphenylene sulfides (PPS), polypropylene (PP), polystyrene (PS), polysulfones (PSU), polytetrafluoro-ethylene (PTFE/TEFLON®), polyvinylchloride (PVC), polyvinylidene fluoride (PVDF), thermoplastic elastomers, polyimides, thermoplastic polyimides, ultra-highmolecular-weight polyethylene (UHMWPE), natural or synthetic rubber, Polyamides (PA), nylons, aliphatic polyamides, semi-aromatic polyamides, aromatic polyamides, polyamide-11 (nylon-11), polyamide-12 (nylon-12), polyamide-4,6, polyamide-6 (nylon-6), polyamide-6,10, polyamide-6,12, polyamide-6,6 (nylon-6,6), polyimide-6,9, polyamides (PA), and the mixtures of two or more thereof.

In another aspect, the present disclosure provides a packaging material formed from the polymer with improved barrier resistance to a permeant. In some embodiments, the permeant is a gas or a liquid. In some embodiments, the gas is oxygen or carbon dioxide. In some embodiments, the liquid is water, fuel, polar or non-polar solvent.

The packaging material may further include other materials, such as paper, ceramic materials, foil or other metallic materials. In some embodiments, the packaging material may be used to form a film. In some embodiments, the packaging material may be used to form a container. In some embodiments, the packaging material may be used to form a fuel tank. In some embodiments, the packaging material may be used to form a blister pack. In some embodiments, the packaging material may be used to form a blow-molded article. In some embodiments, the packaging material may be used to form a wrapping material. In some embodiments, the packaging material may be used to form a waterproofing material (e.g., marine coatings, basement waterproofing material, foundation waterproofing material, below grade waterproofing material, roof waterproofing material, underwater and pool repair products, waterproofing membranes).

The foregoing summary is not intended to define every aspect of the disclosure, and additional aspects are described in other sections, such as the following detailed description. The entire document is intended to be related as a unified disclosure, and it should be understood that all combinations of features described herein are contemplated, even if the combination of features are not found together in the same sentence, or paragraph, or section of this document. Other features and advantages of the invention will become apparent from the following detailed description. It should be understood, however, that the detailed description and the specific examples, while indicating specific embodiments of the disclosure, are given by way of illustration only, because various changes and modifications within the spirit and scope of the disclosure will become apparent to those skilled in the art from this detailed description.

BRIEF DESCRIPTION OF THE DRAWINGS

FIG. 2A shows homogeneous GNF distribution; FIG. 2B shows edge-covalent bonding and surface crystallization of PEEK on GNF edge; and FIG. 2C shows transparent GNFs and very good planar adhesion between GNFs and PEEK matrix.

FIG. 3A shows tensile modulus of PEEK and 35G-PEEK as a function of processing cycle; FIG. 3B shows flexural modulus of PEEK and 35G-PEEK as a function of processing cycle; and FIG. 3C shows Izod impact resistance of PEEK and 35G-PEEK as a function of processing cycle.

FIG. 7A shows an example of the packaging material comprising G-PMC, and FIG. 7B shows an example of the packaging material comprising a layer of G-PMC having a low-level graphene concentration and a layer of G-PMC having a high level of graphene concentration.

FIG. 8A shows an example of the packaging material with a three-layer configuration; and FIG. 8B shows an example of the packaging material with a five-layer configuration.

FIG. 9A shows an example of a blister pack formed from the packaging material. FIG. 9B shows an example of a bottle formed from the packaging material.

FIG. 14C shows permeation as a function of GNF concentration in HDPE for nitrogen, oxygen, and carbon dioxide permeation through G-HDPE nanocomposite films with 0, 0.5, 5, 10, 20, 25, 30, and 35 wt % GNFs after 90-minute melt-mixing.

DETAILED DESCRIPTION OF THE INVENTION

This disclosure provides the methods to enhance barrier resistance of polymers to liquid and gas permeants using lightweight, high-performance graphene-enhanced polymer matrix composites (G-PMCs). G-PMC can be prepared by efficient shear exfoliation of well-crystallized, mined graphite particles into graphene nano-flakes (GNF) within a molten thermoplastic polymer. This unique method is applicable to a wide variety of thermoplastic polymers. It utilizes inexpensive, mined graphite as the raw material, instead of expensive graphene. Such polymers with enhanced barrier resistance can be used to manufacture packaging materials for various applications, for example, packaging food, drug, perfume, etc. and making various containers.

Graphene is known to be impermeable to small gases through its plane. However, technological problems surrounding graphene include high cost to use graphene directly and difficulty to incorporate graphene into a polymer and achieve good particle-matrix interaction in G-PMC. A weak graphene-matrix interaction results in small gaps surrounding graphene particles and accessible paths for permeation. By starting with well-crystallized, mined graphite instead of graphene, the disclosed methods possess several advantages. First, new, pristine surfaces and edges are created on mechanically exfoliated GNFs, which interact and bond strongly with surrounding molten polymer. Second, very high concentrations of graphite can be added to the polymer, in which graphite is subsequently exfoliate into GNFs. During this process, significant property enhancements occur, including mechanical properties, barrier resistance, electrical conductivity, thermal conductivity, ballistics response, blast response, resistance to UV light, etc.

I. GRAPHENE-ENHANCED POLYMER MATRIX COMPOSITES (G-PMCS) WITH HIGH BARRIER RESISTANCE

With the disclosed methods, a high concentration of GNFs in G-PMC can be attained, where GNFs are well-distributed and well-bonded with the polymer matrix. The distribution of GNFs in G-PMC creates tortuous paths for small gases, resulting in superior barrier resistance, with a significant decrease in permeability of various permeants, such as gases and liquids, as compared to other documented graphene-enhanced polymer matrix composites in the literature. This disclosure provides a new, versatile, low cost, and scalable process to produce lightweight, high-performance G-PMCs, which may substitute for much heavier metals in a broad array of commercial and military applications. This material substitution offers cost, weight, and operational energy reduction in some applications. Also, the new materials comprising G-PMC have longer service life since they are corrosion resistant.

Figures 1A, 1B:
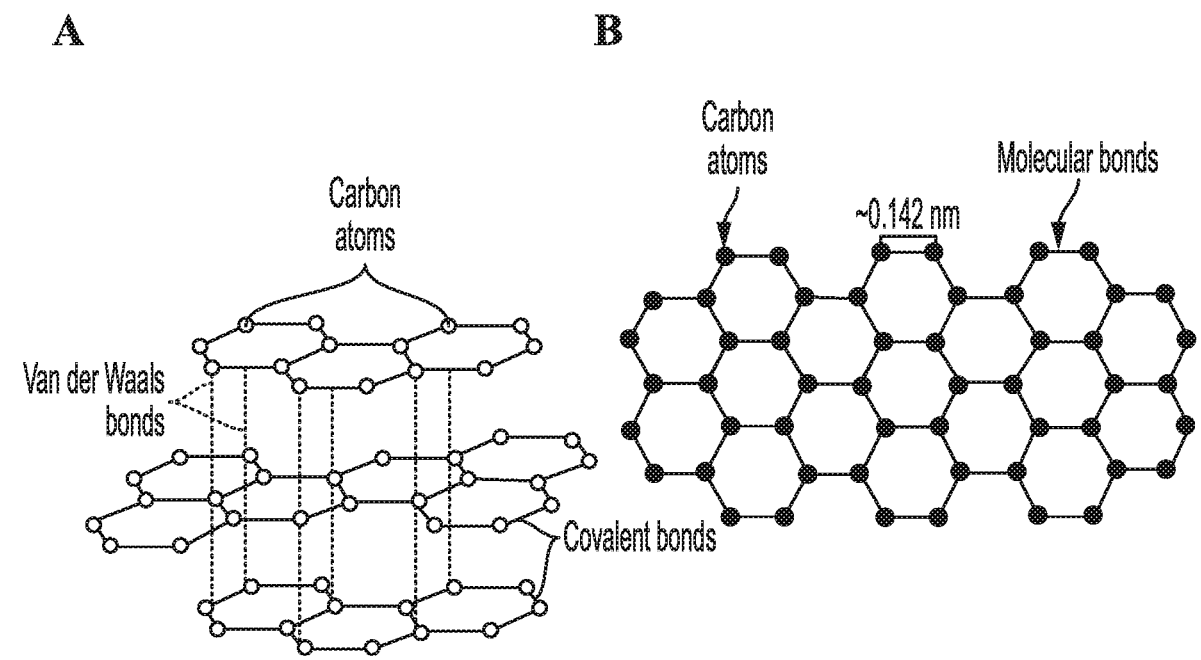
FIGS. 1A and 1B are schematics of graphite showing a layered structure of covalently bonded carbon atoms in a hexagonal array with interlayer secondary bonds (FIG. 1A) and graphene, a single layer of graphite (FIG. 1B).

The methods utilize mined graphite as the raw material instead of graphene. Graphite has a layered structure and is comprised of intra-layer carbon atoms covalently bonded in a hexagonal lattice (graphene) and interlayer van der Waals forces, as shown in FIG. 1. The interlayer shear strength (ISS) of graphite is reported to be approximately 0.14 GPa. Applying shear stresses greater than the ISS can exfoliate graphite to graphene or GNFs. Graphene is a single layer of graphite with Young's modulus of 1 TPa. However, converting graphite to graphene is costly because existing methods generally involve multiple steps and typically require toxic chemicals. The challenges associated with some existing methods include, low yields and re-stacking, and many of these methods are not scaleable in producing large quantities of defect-free graphene. Further, these methods have not yet yielded significant mechanical property improvements, largely due to weak graphene-polymer interaction and inability to incorporate high weight concentrations of graphene into polymers. A further complication relative to graphene is cost. Graphene is very expensive, on the order of $600/gram, while mined graphite costs approximately $1/lb.

In contrast, the present method results in a G-PMC with a uniform distribution of graphene, few-layer graphene, and multi-layer graphene with a significant increase in mechanical properties. Using graphite as the starting raw material, very high loading concentrations of GNFs (35-60 wt %) within polymer can be achieved, and each newly formed graphene surface created during mechanical exfoliation is pristine, providing excellent bonding opportunity with the matrix polymer. The bulk mechanical properties increase with increasing degree of exfoliation (i.e., long mixing times in a batch process or multiple processing cycles in a modified injection molding process). This versatile, low-cost method for G-PMC fabrication via in situ shear exfoliation of graphite in the molten polymer results in new high-performance materials at reduced material and processing costs, allowing entry into a broad array of current and future technologies.

Figure 2A:
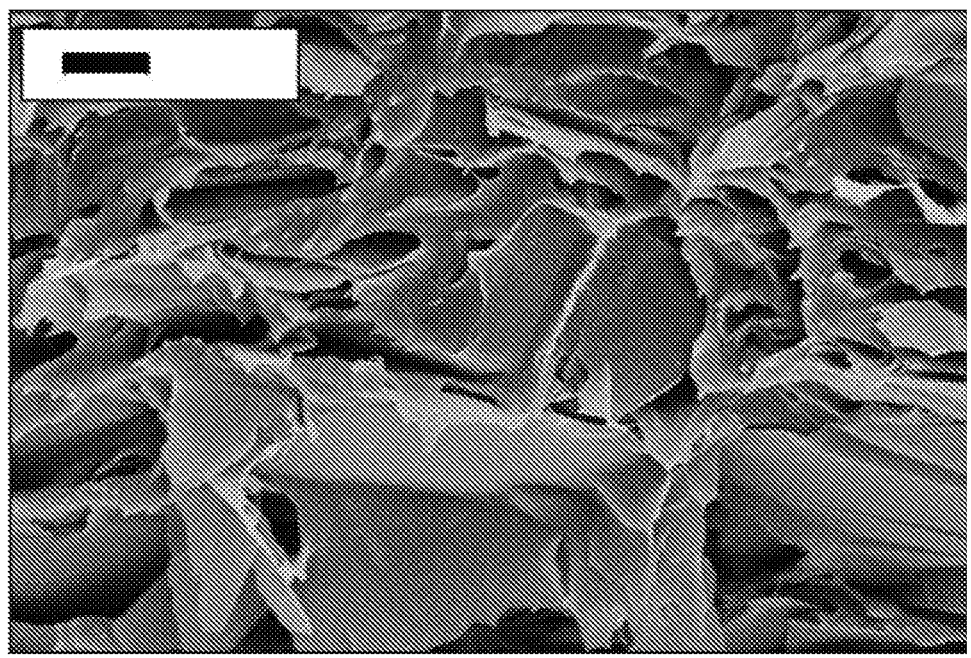
FIGS. 2A, 2B, and 2C (collectively "FIG. 2") show FESEM micrographs of 35 wt % GNFs exfoliated in PEEK, 35G-PEEK.
Figure 2B:
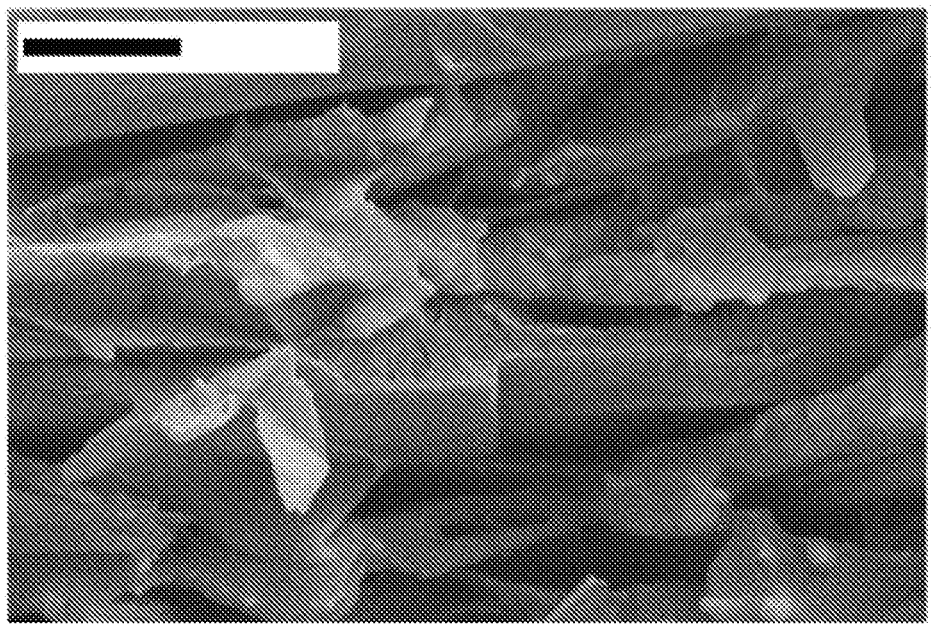
Figure 2C:
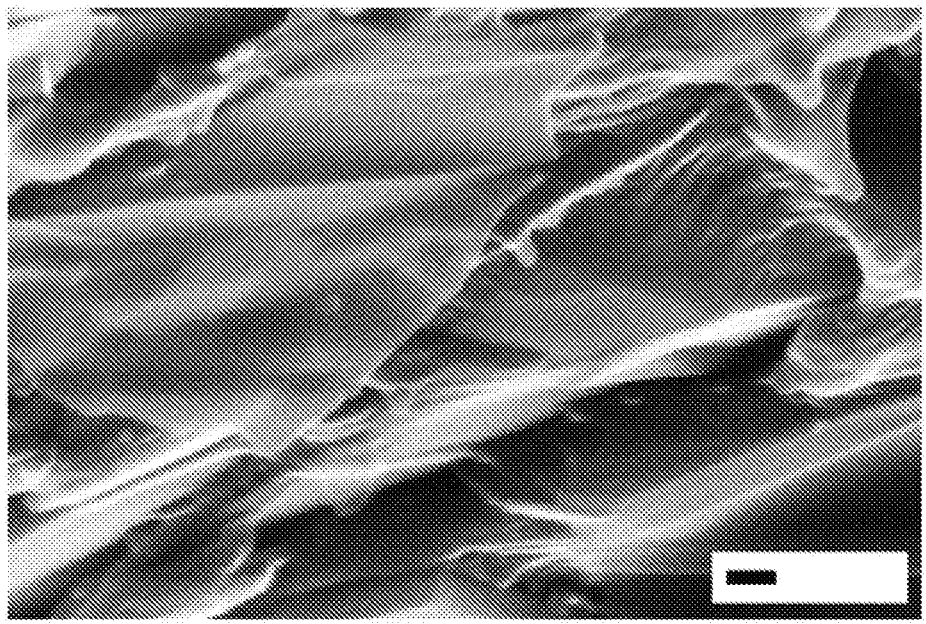
Figure 3A:
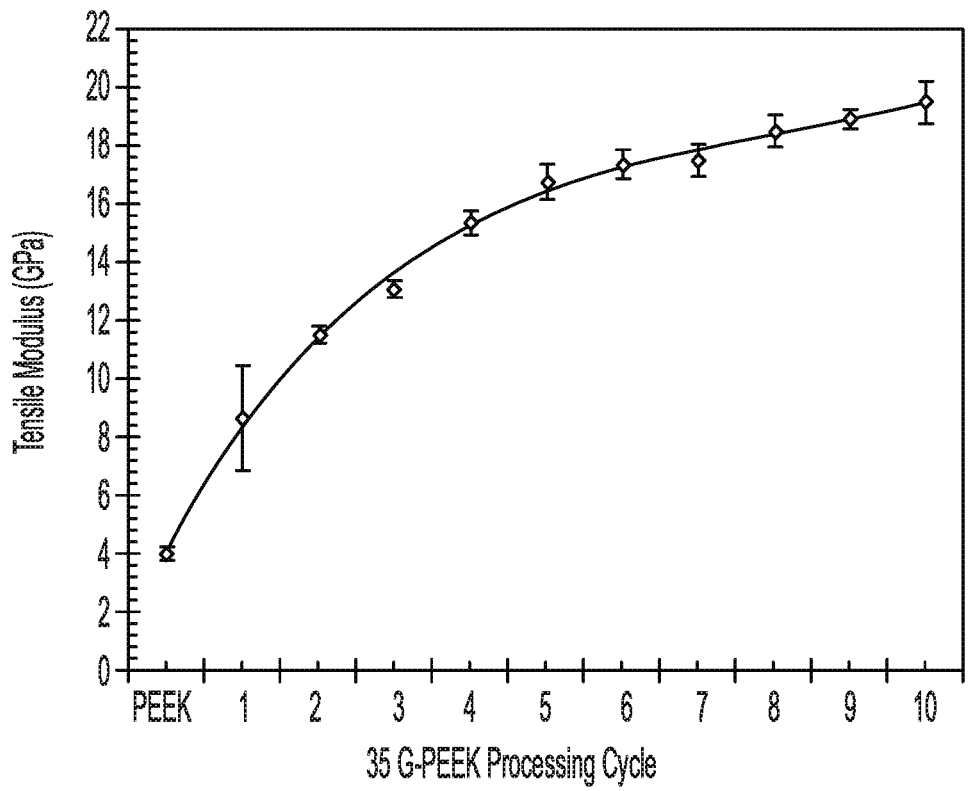
FIGS. 3A, 3B, and 3C (collectively "FIG. 3") show mechanical properties of PEEK and 35G-PEEK as a function of processing cycle.
Figure 3B:
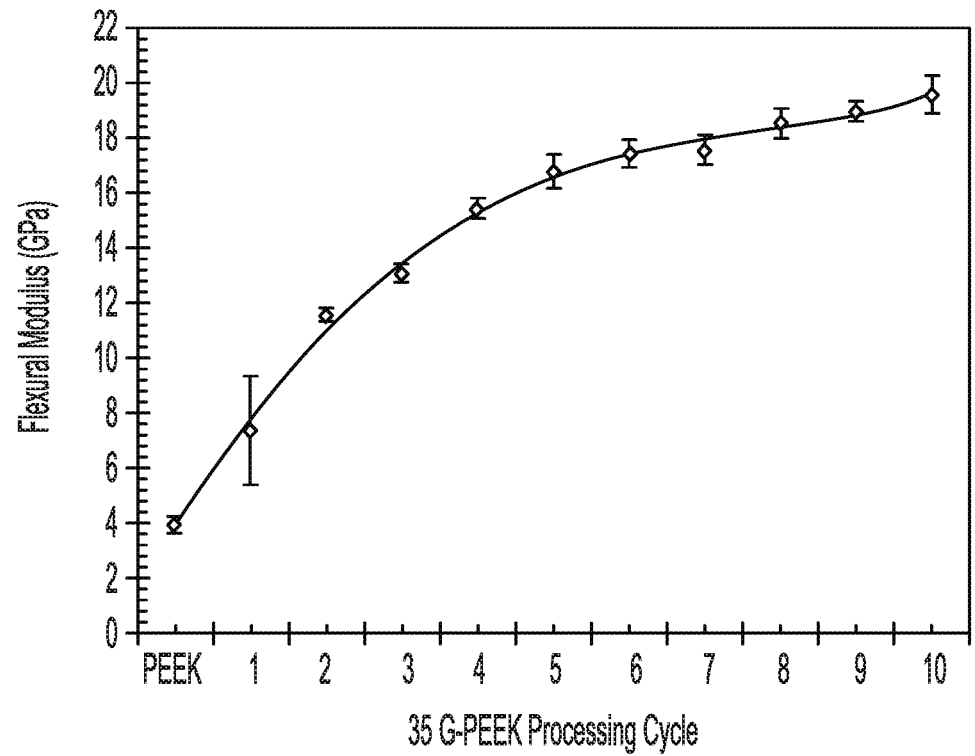
Figure 3C:
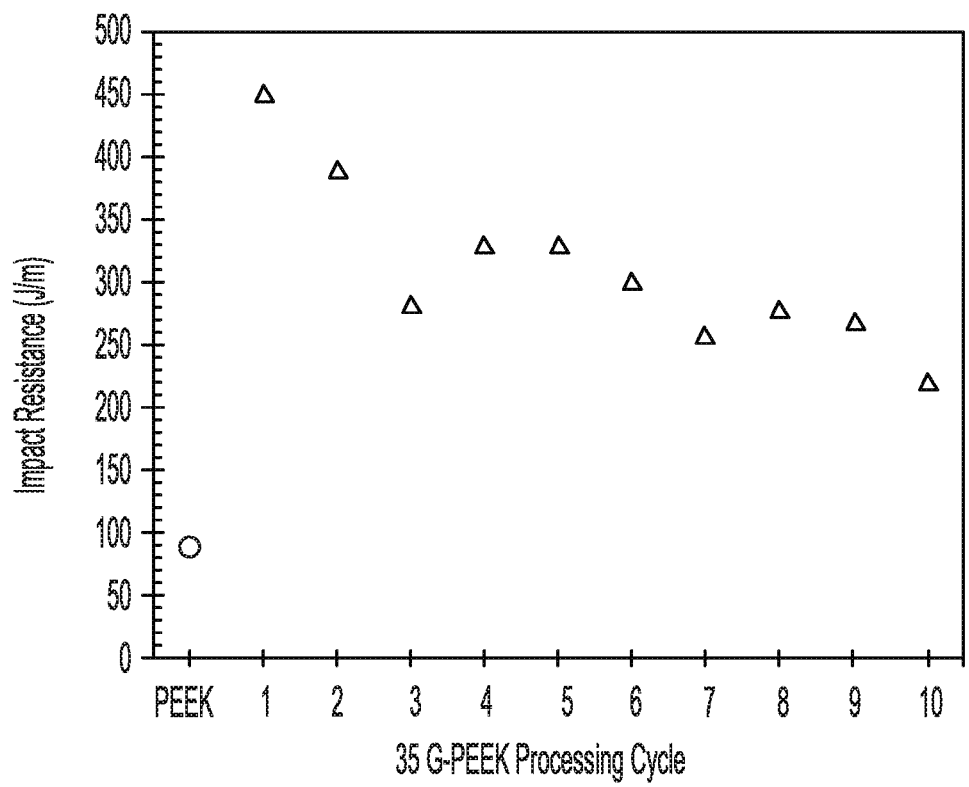

For example, 35 wt % graphite was melt-blended with polyetheretherketone (PEEK) under a nitrogen blanket to reduce the occurrence of polymer degradation at approximately 380° C. using a modified injection molding machine and processed over ten processing cycles (35G-PEEK). Prior to melt-processing, graphite and PEEK were dried in an oven at 400° C. and 160° C., respectively, to remove volatiles. After each processing cycle, some specimens were set aside for characterization and the rest pelletized and dried at 160° C. for further processing cycles. Microstructures were examined using a Zeiss Sigma Field Emission Scanning Electron Microscope (FESEM) of cryogenically fractured surfaces. Micrographs reveal very intimate particle-matrix adhesion, surface crystallization of PEEK on GNF surfaces, transparent GNFs, homogeneous GNF distribution, and GNF orientation, as shown in FIGS. 2A, 2B, and 2C. Mechanical properties in tension, flexure, and Izod impact were determined, according to ASTM D 638, D 790, and D 256, respectively. With increasing processing cycles, or increasing degree of exfoliation, there is a significant increase in modulus in tension and flexure, increase in stress at yield in tension, and an increase in notched Izod impact resistance relative to PEEK, as shown in FIG. 3.

There is a remarkable increase in tensile stiffness from 4 GPa to 20 GPa for PEEK and 35G-PEEK, respectively. This significant increase in modulus is attributed to good planar-adhesive bonding and edge-covalent bonding occurring between GNFs and polymer matrix. The impact resistance also increases significantly from 91 Jim to between 250-450 J/m, depending on the degree of GNF exfoliation, for PEEK and 35G-PEEK, respectively. With the addition of GNFs to PEEK, impact resistance increases and is attributed to GNFs having created a tortuous path for crack propagation across the G-PMC, since the crack must travel around well-distributed GNFs that are well-bonded to the matrix. Others have found a decrease in impact resistance with the addition of graphene, most likely due to weak graphene-matrix interfaces.

Comparing 35G-PEEK with 30 wt % carbon fiber reinforced PEEK indicates equivalent modulus (20 GPa), superior impact resistance, and lower costs. Carbon fibers cost approximately $20/lb, while graphite costs approximately $1/lb. Thus, 35G-PEEK is poised to replace carbon fiber reinforced PEEK at lower costs and better impact performance.

Figure 4:
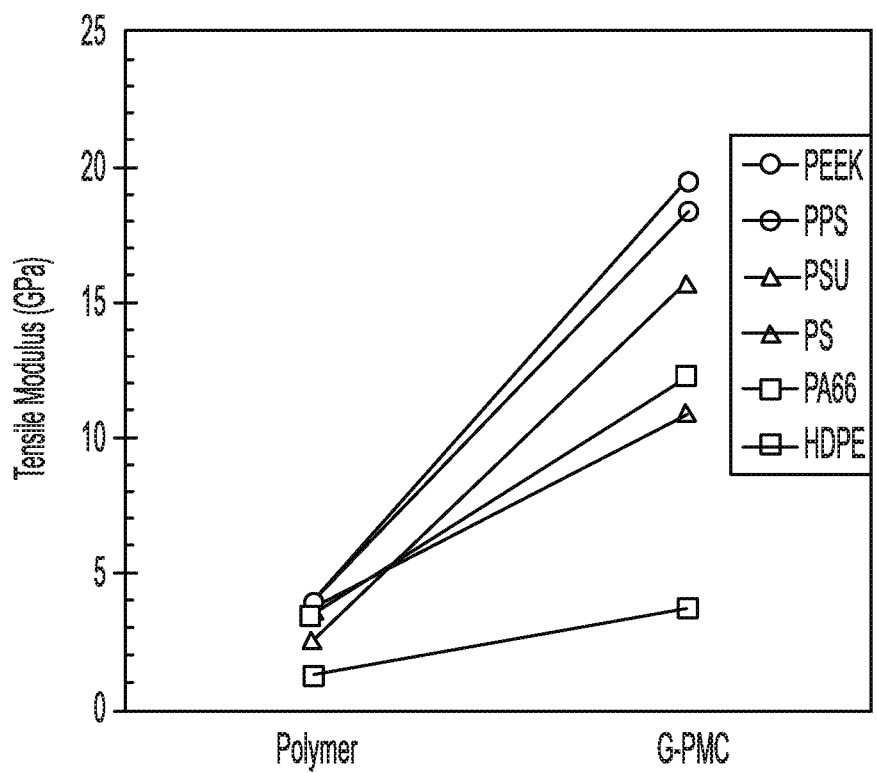
FIG. 4 shows tensile modulus of polymer and its G-PMC of 35 wt % graphite exfoliated in each polymer, for PEEK, PPS, PSU, PS, PA66, and HDPE.

The disclosed method is applicable to a wide variety of thermoplastic polymers and supports good particle-matrix interaction, resulting in enhanced mechanical properties, as shown in FIG. 4. The same method was employed to exfoliate 35 wt % graphite within high-density polyethylene, polyamide 6/6, polystyrene, polysulfone, and polyphenylene sulfide, to produce 35G-HDPE, 35G-PA66, 35G-PS, 35G-PSU, and 35G-PPS, resulting in significant increase in modulus and proving the applicability of the processing method to multiple polymer matrices.

Figure 5:
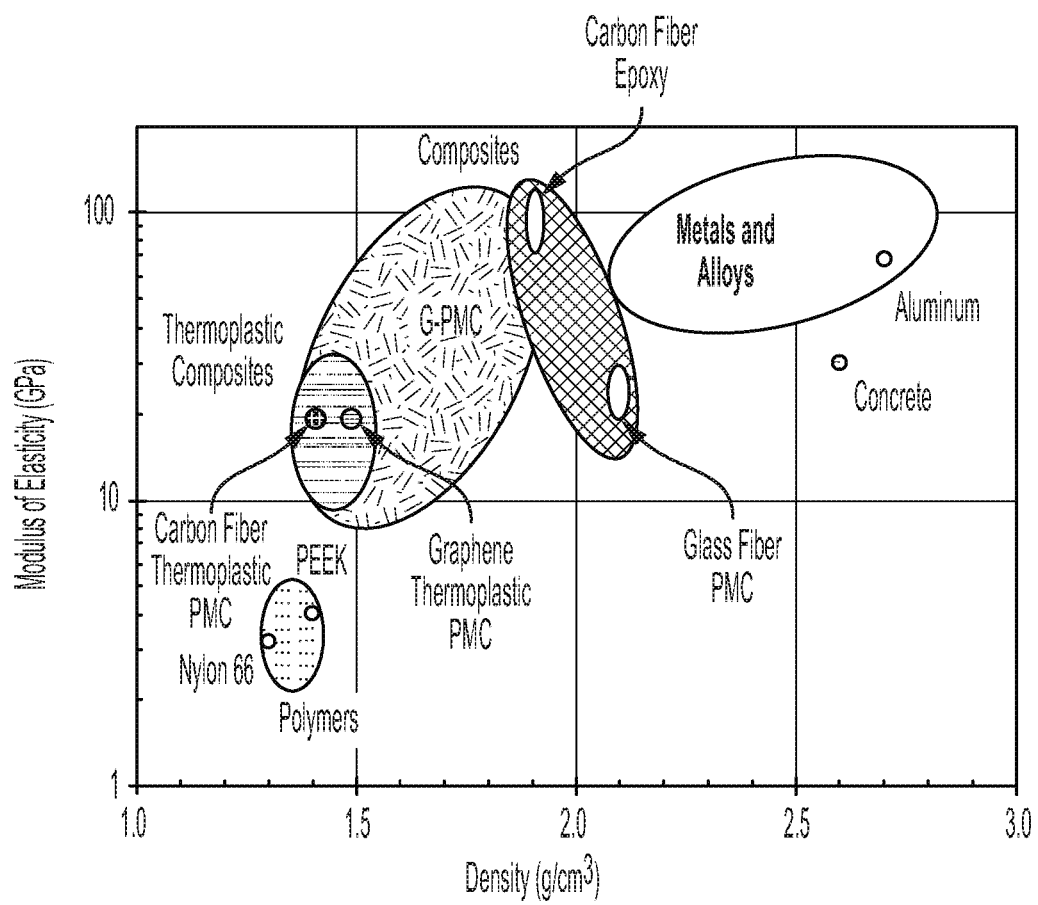
FIG. 5 shows modulus versus density for polymers, thermoplastic composites, current G-PMC, potential G-PMCs, carbon fiber epoxy composites, and metals.

FIG. 5 shows potential moduli of G-PMCs, as indicated by the arrow in the ash by the plot of modulus versus density. A similar processing method to compound bi/tri-layer graphene with PEEK was investigated. Using graphene as the starting material, only a modest increase in torsional modulus occurred. For this reason, in situ shear exfoliation of mined graphite in molten thermoplastic polymers is used to improve mechanical properties.

The present methods provide improved barrier resistance of these G-PMCs to small gases (e.g., oxygen, carbon dioxide, and water vapor) for packaging applications, to fuels for fuel tank applications, and to water for waterproofing applications (e.g., marine coatings, basement waterproofing material, foundation waterproofing material, below grade waterproofing material, roof waterproofing material, underwater and pool repair products, waterproofing membranes).

Graphene is known to be impermeable to small gases through its plane. In a G-PMC, graphene must be compatible (i.e., strong particle-matrix interaction) with the surrounding polymer in order to provide decreased permeability. A weak graphene-matrix interaction results in small gaps surrounding graphene particles and an easy path for permeation. However, it is well known in the art that it is difficult to achieve good graphene-polymer bonding, limiting the improvement in mechanical properties of graphene-enhanced G-PMCs.

Figure 6:
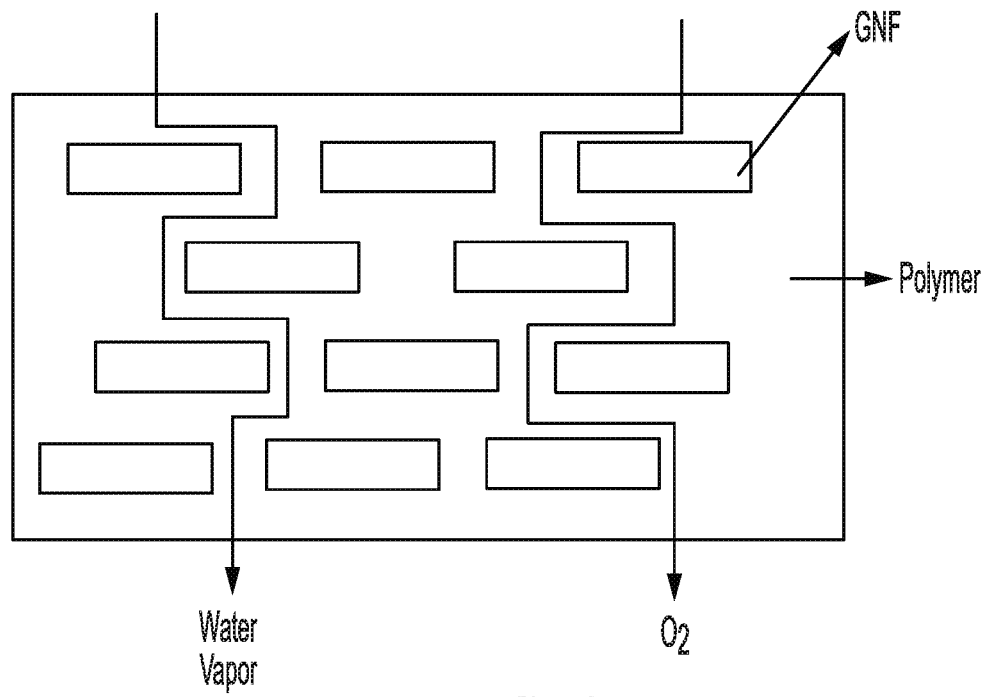
FIG. 6 shows a tortuous diffusion pathway through a G-PMC.

In G-PMC provided by the present method, GNFs are well distributed and well-bonded with the polymer matrix, creating a tortuous path for permeation of small gases, as shown FIG. 6, similar to crack propagation during impact testing previously mentioned. Thus, a more significant decrease in permeability of small gases and fuels (i.e., superior barrier resistance) can be achieved by G-PMCs described in this disclosure, as compared to other documented graphene-enhanced PMCs in the literature.

G-PMC provided by the present method may contain unexfoliated graphite. As with graphene, graphite is also impermeable to gas and liquid. Such G-PMC containing both graphene and graphite represents a brand new class of materials which can be used in packaging and other areas. Plastic materials have a wide range of use due to their flexibility in forming various shapes. For example, plastic materials can be easily shaped into films, bottles, jars, tubes, carton, wrapping materials, cartons, and thermoforms. In spite of their versatility, the inherent permeability to gases and vapors limits their applications, for example, in packaging. In addition, many plastic materials are sensitive to UV light which results in degradation of plastic materials. Metal and glass, on other hands, do not have such deficiency in permeability to gases and vapors. However, they cannot be easily fabricated like plastic materials. In addition, glass materials are sensitive to shock and impact force, and require extra care in shipping and handling. G-PMC provided by the present method maintains the versatility of plastic materials and meanwhile has barrier resistance to gas and liquid. G-PMC also provides some degree protection against UV light so that it extends the shelf life of packaged products. These properties render G-PMC a desirable material for a wide variety of applications.

In one aspect, the present disclosure provides a packaging material comprising a graphene-reinforced polymer matrix composite. In some embodiments, the graphene-reinforced polymer matrix composite comprises between about 0.1 wt % and about 50 wt % of graphene, between about 0.1 wt % and about 30 wt % of graphene, between about 1 wt % and about 10 wt % of graphene, between about 5 wt % and about 50 wt % of graphene, or between about 10 wt % and about 30 wt % of graphene.

In some embodiments, the graphene-reinforced polymer matrix composite comprises a thermoplastic polymer selected from the group consisting of acrylics, polymethylmethacrylate (PMMA), acrylonitrile, acrylonitrile butadiene styrene (ABS) co-polymers, polyarylate, polyacrylonitriles (PAN), polyamideimide (PAI), aromatic polysulfones, aromatic thermoplastic polyesters, liquid crystal polymers, polyarylether-ketones, polycarbonates (PC), polydimethyl siloxane (PDMS), polyaryletherketones (PAEK), polyetherether-ketones (PEEK), polyethylene naphthalene dicarboxylate (PEN), polyetherimides (PEI), polyetherketones (PEK), polyethylene, Polyethersulfone, polysulphone (PSul), polyethylene sulfide (PES), polyethylene terephthalate (PET or PETE), low-density polyethylene (LDPE), high-density polyethylene (HDPE), polyglycolic acid (PGA), polylactic acids (PLA), polylactic-glycolic acid copolymers (PLGA), polyoxymethylene plastic (POM/Acetal), polyphenylene ethers, polyphenylene oxide (PPO), polyphenylene sulfides (PPS), polypropylene (PP), polystyrene (PS), polysulfones (PSU), polytetrafluoro-ethylene (PTFE/TEFLON®), polyvinylchloride (PVC), polyvinylidene fluoride (PVDF), thermoplastic elastomers, polyimides, thermosplastic polyimides, ultra-highmolecular-weight polyethylene (UHMWPE), natural or synthetic rubber, Polyamides (PA), nylons, aliphatic polyamides, semi-aromatic polyamides, aromatic polyamides, polyamide-11 (nylon-11), polyamide-12 (nylon-12), polyamide-4,6, polyamide-6 (nylon-6), polyamide-6,10, polyamide-6,12, polyamide-6,6 (nylon-6,6), polyamide-6,9, polyamides (PA), and the mixtures of two or more thereof. When the thermoplastic host polymer and the cross-linked polymer are the same polymer species, the cross-linked polymer particles are essentially a concentrated masterbatch of the degree of cross-linked species desired to be introduced to the polymer formulation.

In some embodiments, the thermoplastic host polymer is selected from the group consisting of polyamides, polystyrenes, polyphenylene sulfides, high-density polyethylenes, acrylonitrile butadiene styrene (ABS) polymers, polyacrylonitriles, polylactic acids (PLA), polyglycolic acid (PGA) and polylactic-glycolic acid copolymers (PLGA). Polyamides include aliphatic polyamides, semi-aromatic polyamides, and aromatic polyamides. Aliphatic polyamides contain no aromatic moieties. In one embodiment the aliphatic polyamides are selected from the group consisting of polyamide-6,6 (nylon-6,6), polyamide-6 (nylon-6), polyamide-6,9; polyamide-6,10; polyamide-6,12; polyamide-4,6; polyamide-11 (nylon-11), polyamide-12 (nylon-12) and other nylons. Nylons are a well-known class of aliphatic polyamide derived from aliphatic diamines and aliphatic diacids. Alternatively, other polyamides also classed as nylons are derived from ring-opening polymerization of a lactam, such as nylon-6 (PA-6, polycaprolactam), derived from caprolactam. In a particularly preferred embodiment, the aliphatic polyamide is polyamide-6,6, which is derived from hexamethylenediamine and adipic acid. Semi-aromatic polyamides contain a mixture of aliphatic and aromatic moieties and can be derived, for example, from an aliphatic diamine and an aromatic diacid. The semi-aromatic polyamide can be a polyphthalamide (PPA) such as PA-6T, which is derived from hexamethylenediamine and terephthalic acid. Aromatic polyamides, also known as aramids, contain aromatic moieties and can be derived, for example, from an aromatic diamine and an aromatic diacid. The aromatic polyamide can be a para-aramid such as those derived from para-phenylenediamine and terephthalic acid. A representative of the latter includes KEVLAR®.

In some embodiments, the thermoplastic host polymer is an aromatic polymer. As defined herein the term "aromatic polymer" refers to a polymer comprising aromatic moieties, either as part of the polymer backbone or as substituents attached to the polymer backbone, optionally via a linker. Linkers include linear or branched alkylene groups, such as methylene, ethylene, and propylene, linear or branched heteroalkylene groups, such as —$OCH_2$—, —$CH_2O$—, —$OCH_2CH_2$—, —$CH_2CH_2O$—, —$OCH_2CH_2CH_2$—, —$CH_2OCH_2$—, —$OCH(CH_3)$—, —$SCH_2$—, —$CH_2S$—, —$NRCH_2$—, —$CH_2NR$—, and the like, where the heteroatom is selected from the group consisting of oxygen, nitrogen, and sulfur, and R is selected from hydrogen and lower alkyl. Linkers can also be heteroatomic, such as —O—, —NR— and —S—. When the linkers contain sulfur, the sulfur atom is optionally oxidized. The aromatic moieties are selected from monocyclic, e.g., phenyl, and polycyclic moieties, e.g., indole naphthyl, anthracene, etc., and are optionally substituted with amino, NHR, $NR_2$, halogen, nitro, cyano, alkylthio, alkoxy, alkyl, haloalkyl, $CO_2R$ where R is defined as above, and combinations of two or more thereof. The aromatic moieties can also be heteroaryl, comprising one to three heteroatoms selected from the group consisting of oxygen, nitrogen, and sulfur, and optionally substituted as described above. The aromatic polymer preferably comprises phenyl groups, optionally substituted as disclosed above, either as part of the polymer backbone or as substituents on the backbone, the latter optionally through a linker, as disclosed above. In some embodiments, the optionally substituted phenyl groups are contained within the polymer backbone as optionally substituted phenylene groups. In certain other embodiments, the optionally substituted phenyl groups are substituents on the polymer backbone, optionally connected through a linker, as described above.

In some embodiments, the graphene-reinforced polymer matrix composite comprises about 50 wt % of a total composite weight of particles selected from the group consisting of graphite microparticles, single-layer graphene nanoparticles, multi-layer graphene nanoparticles, and combinations of two or more thereof. In some embodiments, the particles comprise single- and/or multi-layer graphene nanoparticles less than 10 nanometers thick along the c-axis direction.

In some embodiments, the thermoplastic polymer is intermolecularly cross-linked by torn single- and/or multi-layer graphene sheets having carbon atoms with reactive bonding sites on the torn edges of said sheets.

II. G-PMCS-ENHANCED PACKAGING MATERIALS AND USE THEREOF

In another aspect, the packaging material comprises a graphene-reinforced polymer matrix composite which is prepared by:

(a) distributing graphite microparticles into a molten thermoplastic polymer phase, wherein at least 50 wt % of the graphite in the graphite microparticles consists of multilayer graphite crystals between 1.0 and 1000 microns thick along a c-axis direction; and (b) applying a succession of shear strain events to the molten polymer phase so that the shear stress within said molten polymer phase is equal to or greater than the Interlayer Shear Strength (ISS) of said graphite microparticles and said molten polymer phase exfoliates the graphite successively with each event until said graphite is at least partially exfoliated to form a distribution in the molten polymer phase of single- and multi-layer graphene nanoparticles less than 10 nanometers thick along the c-axis direction.

Figure 7A:
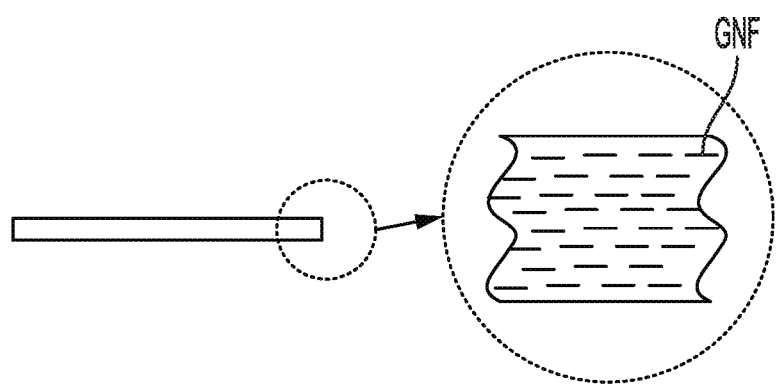
FIGS. 7A and 7B (collectively "FIG. 7") show examples of packaging materials.

In some embodiments, the packaging material comprises one or more layers of the graphene-reinforced polymer matrix composite (G-PMC). FIG. 7A illustrates an example of the packaging material comprising a single layer of G-PMC, wherein GNPs have an essentially uniform distribution in the thermoplastic polymer. Graphene layers in the polymer matrix are able to produce a tortuous path which works as a barrier structure for gases or liquids. A high tortuosity leads to higher barrier properties and lower permeability of G-PMCs.

Figure 7B:
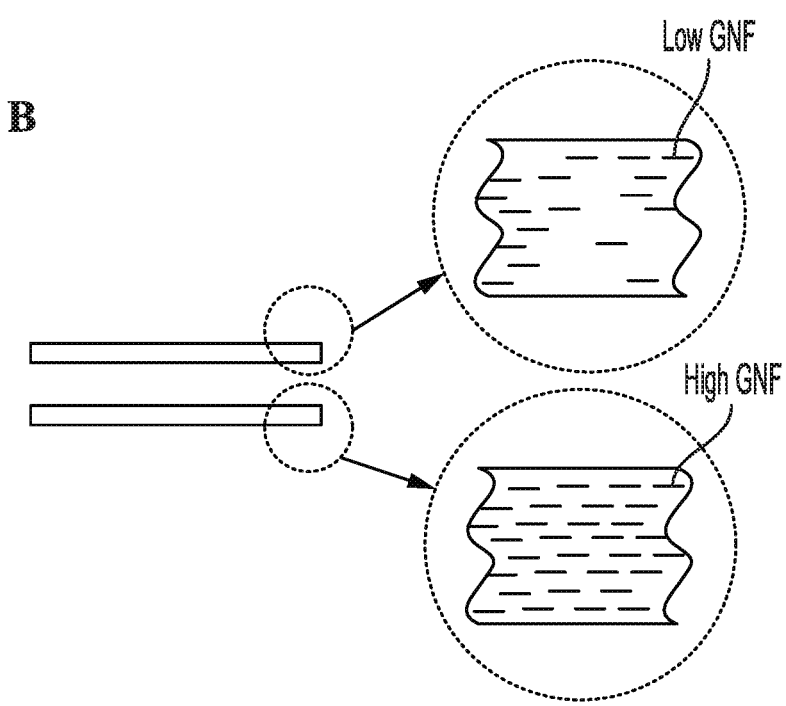

The present method for in situ exfoliation of graphite into a molten thermoplastic polymer phase may result in different levels of graphene concentration in G-PMCs. As such, G-PMCs with low graphene concentration may have lower barrier resistance than G-PMCs with high graphene concentration. In some embodiments, as shown in FIG. 7B, the packaging material may contain one or more layers of G-PMCs with low graphene concentration and one or more layers of G-PMCs with high graphene concentration. Such configuration will ensure that the barrier resistance is not compromised by low tortuosity of the G-PMC layer with low graphene concentration and the packaging material as a whole has high barrier resistance to UV light, gases, and liquids.

Figure 8A:
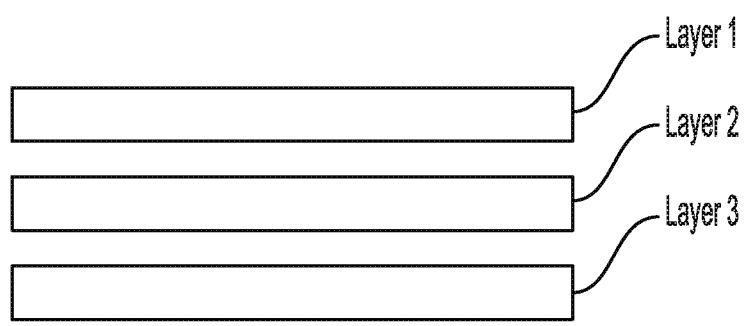
FIGS. 8A and 8B (collectively "FIG. 8") show examples of layered packaging materials.
Figure 8B:
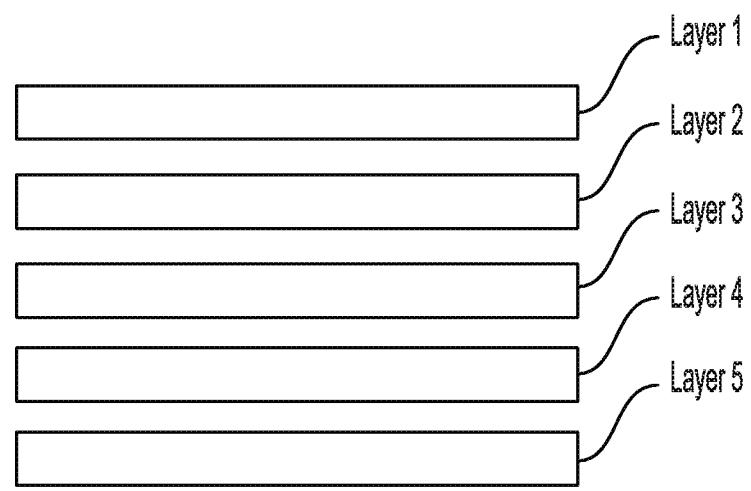

FIG. 8A illustrates an example of the packaging material with a three-layer configuration having one or more layers of G-PMC and one or more layers of other materials. In one embodiment, the packaging material has plastic material as Layer 1, G-PMC as Layer 2, and plastic material as Layer 3. One application of such configuration is food packaging, where plastic Layer 1 can be used for printing product information or for decorative purposes; G-PMC Layer 2 provides barrier resistance for moisture, oxygen, etc.; and plastic Layer 3 can serve to have direct contacts with food or any product packaged therein. In another embodiment, the packaging material has G-PMC as Layer 1, plastic material as Layer 2, and G-PMC as Layer 3. Such a configuration may be useful for packaging products that require better barrier resistance to various permeants. In yet another embodiment, the packaging material has plastic material as Layer 1, G-PMC as Layer 2, and paper as Layer 3. It should be understood, however, that it is possible to further include additional layers of any materials between existing layers as described in the above configurations. For example, in some embodiments, adhesives can be used between the G-PMC layer and the plastic layer or any two adjacent layers of the packaging material. Alternatively, the packaging material can have a five-layer configuration, as illustrated in FIG. 8B. For example, in one embodiment, the packaging material contains plastic material as Layer 1, G-PMC as Layer 2, plastic material as Layer 3, aluminum foil as Layer 4, and plastic material as Layer 5. In another embodiment, the packaging material contains plastic material as Layer 1, G-PMC as Layer 2, plastic material as Layer 3, flexible ceramic material as Layer 4, and plastic material as Layer 5. The plastic material of Layer 1 can be used for direct contacts with food or other products packaged therein. The plastic material of Layer 3 can be adhesives affixing aluminum foil layer to the G-PMC layer. The plastic material of Layer 5 can be used for printing product information and/or for decorative purposes.

In some embodiments, the packaging material further comprises one or more layers of material which comprises paper. In some embodiments, the packaging material comprises one or more layers of material which comprises plastic. In some embodiments, the packaging material comprises one or more layers of material which comprises metal. In some embodiments, the packaging material comprises one or more layers of foil. In some embodiments, the packaging material comprises one or more layers of flexible ceramic materials.

In another aspect, the present disclosure provides a method of improving barrier resistance of a polymeric material to a permeant. The method includes forming a graphene-reinforced polymer matrix composite within the polymer. In some embodiments, the method of forming the graphene-reinforced polymer matrix composite within the polymer include:

(a) distributing graphite microparticles into a molten thermoplastic polymer phase of the polymer, wherein at least 50 wt % of the graphite in the graphite microparticles consists of multilayer graphite crystals between 1.0 and 1000 microns thick along a c-axis direction; and (b) applying a succession of shear strain events to the molten polymer phase so that the shear stress within said molten polymer phase is equal to or greater than the Interlayer Shear Strength (ISS) of said graphite microparticles and said molten polymer phase exfoliates the graphite successively with each event until said graphite is at least partially exfoliated to form a distribution in the molten polymer phase of single- and multi-layer graphene nanoparticles less than 10 nanometers thick along the c-axis direction.

In another aspect, the present disclosure provides a method of improving barrier resistance of a polymeric material to a permeant. The method includes forming a carbon fiber-reinforced polymer matrix composite. In some embodiments, the method includes (a) distributing carbon fibers into a molten carbon-containing polymer phase comprising one or more molten carbon-containing polymers; (b) breaking or cutting said carbon fibers in the presence of said molten thermoplastic polymer phase by (i) applying a succession of shear strain events to the molten polymer phase so that said molten polymer phase breaks said carbon fibers, or (ii) mechanically breaking or cutting said carbon fibers in the presence of the molten polymer phase, thereby producing reactive edges on the fibers that react with and cross-link said one or more carbon-containing polymers; and (c) thoroughly mixing said broken or cut carbon fibers with said molten polymer phase.

In some embodiments, the succession of shear strain events is applied until at least 50% by weight of the graphite is exfoliated to form a distribution in the molten polymer phase of single- and multi-layer graphene nanoparticles less than 10 nanometers thick along the c-axis direction. In some embodiments, the succession of shear strain events is applied until at least 90%, until at least 80%, until at least 75%, until at least 70%, or until at least 60% by weight of the graphite is exfoliated to form a distribution in the molten polymer phase of single- and multi-layer graphene nanoparticles less than 10 nanometers thick along the c-axis direction.

In another aspect, the present disclosure provides a packaging material formed from the polymer obtained from the present method for improving barrier resistance the polymer to a permeant. In some embodiments, the permeant is a gas, a steam, a vapor, a liquid, a liquefied gas.

Non-limiting examples of gas include elemental gases, pure and/or mixed gases, and toxic gases. Non-limiting examples include hydrogen, nitrogen, oxygen, fluorine, chlorine, helium, neon, argon, krypton, xenon, and radon. Non-limiting examples of pure and/or mixed gases include acetylene, air, ammonia, arsine, benzene, boron trifluoride, butadiene 1,3, butane, 1-butene, carbon dioxide, carbon monoxide, diborane, ethane, ethylene, ethylene oxide, germane, halocarbon-14, halocarbon-21, halocarbon-22, halocarbon-23, halocarbon-32, halocarbon-116, halocarbon-134a, halocarbon-218, halocarbon-c318, hexane, hydrogen bromide, hydrogen chloride, hydrogen sulfide, isobutane, isobutylene, methane, methanol, methyl chloride, nitric oxide, nitrogen dioxide, nitrogen trifluoride, nitrous oxide, pentane, phosphine, propane, propylene, silane, silicon tetrachloride, sulfur dioxide, sulfur hexafluoride, trichlorosilane, tungsten hexafluoride, vinyl chloride. Non-limiting examples of toxic gases include arsenic, arsine, bis (trifluoromethyl), boron tribromide, boron trichloride, boron trifluoride, bromine, bromine chloride, bromomethane, carbon monoxide, chlorine, chlorine pentafluoride, chlorine trifluoride, chlorofluorocarbons, chloropicrin, cyanogen, cyanogen chloride, diazomethane, diborane, dichloroacetylene, dichlorosilane, formaldehyde, germane, hexaethyl tetraphosphate, hydrogen azide, hydrogen cyanide, hydrogen selenide, hydrogen sulfide, hydrogen telluride, nickel tetracarbonyl, nitrogen dioxide, osmium tetroxide, oxygen difluoride, perchloryl fluoride, perfluoroisobutylene, phosgene, phosphine, phosphorus pentafluoride, selenium hexafluoride, silicon tetrachloride, silicon tetrafluoride, stibine, disulfur decafluoride, sulfur tetrafluoride, tellurium hexafluoride, tetraethyl pyrophosphate, tetraethyl dithiopyrophosphate, trifluoro acetylchloride, tungsten hexafluoride. In specific embodiments, the gases permeant is oxygen or carbon dioxide.

Non-limiting examples of liquid include water, ethanol, milk, blood, urine, gasoline, mercury, bromine, wine, rubbing alcohol, honey, coffee, and other organic or inorganic solvents. Liquids also include aqueous solutions like household bleach, other mixtures of different substances such as mineral oil and gasoline, emulsions like vinaigrette or mayonnaise, suspensions like blood, and colloids like paint and milk, etc. In some embodiments, gases also are liquefied, such as liquid oxygen, liquid nitrogen, liquid hydrogen, and liquid helium. In specific embodiments, liquid permeant is water or fuel.

In another aspect, the packaging material may further include other materials, such as paper, ceramic materials, foil or other metallic materials. In some embodiments, the packaging material may include one or more layers of the polymer obtained from the present method for improving barrier resistance of the polymer to a permeant. In some embodiments, the packaging materials may include one or more layers of other materials.

Non-limiting examples of other materials that may be included in the packaging material include adhesive, aluminium foil, bopet, container compression test, bubble wrap, bubble wrap (brand), cellophane, coated paper, corrugated fiberboard, corrugated plastic, dunnage, ethylene vinyl alcohol, expanded polyethylene, filament tape, foam peanut, fugitive glue, glass, hessian fabric, hot-melt adhesive, inflatable air cushion, jute, kraft paper, linear low-density polyethylene, liquid packaging board, low-density polyethylene, medium-density polyethylene, metallised film, molded pulp, mycobond, nalgene, nonwoven fabric, paper, paperboard, plastic film, plastic wrap, plastic-coated paper, polybutylene succinate, polyester, polyethylene, polymethylpentene, polypropylene, polypropylene raffia, polystyrene, pressure-sensitive tape, pullulan, saran (plastic), shrink wrap, six-pack rings, smart label, smithers-oasis, soilon, stone paper, strapping, straw, styrene-acrylonitrile resin, susceptor, tear tape, tissue paper, unica (material), velostat, waxtite, wiki-cell, wrapping tissue.

In some embodiments, the packaging material may be used to form a film. In some embodiments, the packaging material may be used to form a container. In some embodiments, the packaging material may be used to form a fuel tank (i.e., automobile fuel tanks, aircraft fuel tanks, boat fuel tanks). In some embodiments, the packaging material may be used to form a racing fuel cell. In some embodiments, the packaging material may be used to form a blister pack. In some embodiments, the packaging material may be used to form a waterproofing material (e.g., marine coatings, basement waterproofing material, foundation waterproofing material, below grade waterproofing material, roof waterproofing material, underwater and pool repair products, waterproofing membranes).

As understood by one of ordinary skill in the art, the packaging material provided in this disclosure may be used to make any types of container by otherwise conventional means once the inventive method has been used to make the packaging material. Non-limiting examples of the containers include bags, bins, bottles, boxes, blister packs, buckets, cans, cartons, coolers, crates, cups, drums, envelops, hoppers, pallets, pots, reels, satchels, shipping containers, shrinkwrap, storage tanks and cylinders, tubes, vials, wrappers, etc.

Common polymers used in packaging applications include polyethylene (PE), polypropylene (PP), polystyrene (PS), polyvinyl chloride (PVC), and polyethylene terephthalate (PET), and gas permeation through these polymers determines their service performance. Incorporation of the present packaging material will provide superior service performance. The most common plastic packaging is the HDPE rigid container used for items, such as beverages, household goods, and pharmaceutical and the PET rigid container for carbonated drinks.

In some embodiments, the packaging material may be used for pharmaceutical packaging (or drug packaging) to reduce the permeability of oxygen or moisture. Pharmaceutical packaging is the packages and the packaging processes for pharmaceutical preparations. It involves all of the operations from production through distribution channels to the end consumer. Pharmaceutical packaging is highly regulated but with some variation in the details, depending on the country of origin or the region. Several common factors can include: assurance of patient safety, assurance of the efficacy of the drug through the intended shelf life, uniformity of the drug through different production lots, thorough documentation of all materials and processes, control of possible migration of packaging components into the drug, control of degradation of the drug by oxygen, moisture, heat, light, etc., prevention of microbial contamination, sterility, etc. The wide variety of pharmaceutical solids, liquids, and gasses are packaged in a wide variety of packages. The common primary packages are mostly rigid containers, such as blister packs, bottles, and timed dosing packets. Blister packs are pre-formed plastic/paper/foil packaging used for formed solid drugs. The primary component of a blister pack is a cavity or pocket made from a thermoformed plastic. Blister packs typically have multiple layers of PVC, polyvinylidene chloride (PVDC), HDPE, and aluminum. This usually has a backing of paperboard or a lidding seal of aluminum foil or plastic film. Blister packs are useful for protecting drugs against external factors, such as humidity and contamination for extended periods of time. Bottles are commonly used for liquid pharmaceuticals as well as formed tablets and capsules. Glass is most common for liquids because it is inert and has excellent barrier properties. Various types of plastic bottles are used both by drug producers as well as by pharmacists in a pharmacy.

The disclosed packaging material with improved barrier resistance reduces the permeability of oxygen or moisture, and thus reduce degradation of the drugs and prolong the drug shelf life. It allows for a thinner package, lower number of required layers, remove the need for the aluminum layer, simpler manufacturing, lower costs, and extend medication expiration date. In some embodiments, the packaging material may be used to form bottles for drug packaging. The bottle wall may have single -or multiple- layer G-PMC, and, additionally and/or optionally, have one or more other plastic inner or outer layers.

Figure 9A:
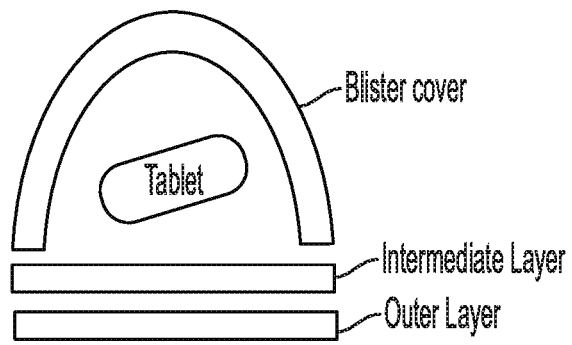
FIGS. 9A and 9B (collectively "FIG. 9") show examples of use of the packaging materials.

FIG. 9A illustrates an example of a blister pack made of the disclosed packaging material. In some embodiments, the blister pack includes an outer layer which contains a plastic material. In some embodiments, the blister pack includes an intermediate layer which contains paper. In some embodiments, the blister pack includes a blister cover which contains G-PMC.

Figure 9B:
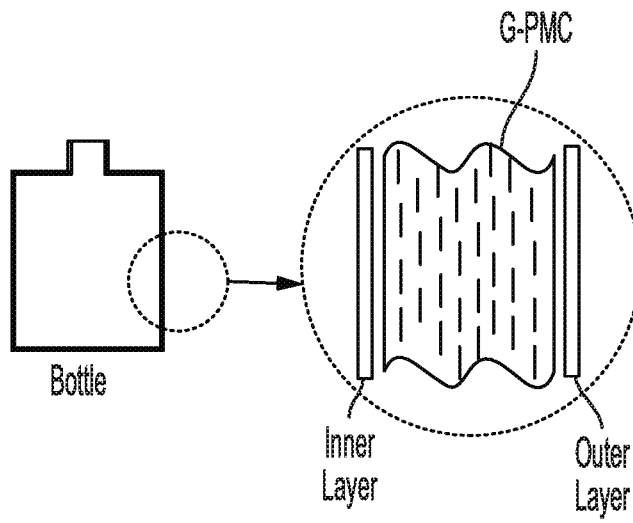

FIG. 9B illustrates an example of a bottle which contains G-PMC. In some embodiments, a bottle wall may have one or more layers of different materials to exploit their respective properties. For example, in one embodiment, the bottle wall contains an inner layer making contacts with products packaged therein, a center layer containing G-PMC, and an outer layer. In some embodiments, the inner layer can be formed from a plastic material. In some embodiments, the outer layer can also be formed from a plastic material where the product information can be printed thereon.

In some embodiments, the packaging material may be used to make fuel tanks. Common polymers used in fuel tank applications include polyamide 6 (PA 6) or ethylene vinyl alcohol (EVOH), sandwiched between layers of a semi-crystalline thermoplastic, such as high-density polyethylene (HDPE) with an adhesive layer of maleic anhydride grafted polypropylene (PP) to ensure good adhesion. The structure of a multi-layer tank offers evaporative emission exceeding current US EPA standards and excellent resistance to ethanol fuels, slosh, and abrasion. However, PA6 and EVOH are both sensitive to humidity level, and moisture absorption deteriorates barrier resistance performance. A fuel tank fabricated from the present packaging material eliminates the need for this complicated layered structure, thereby allowing easier manufacturing methods and reducing costs, and allowing the use of other polymer matrices previously not considered. The lightweight fuel tank fabricated from the present packaging material would also provide structural integrity, since mechanical properties are greatly enhanced by the GNFs, thereby competing more directly with heavy steel fuel tanks.

In some embodiments, the disclosed packaging material can be used for waterproofing applications due to its barrier resistance to water. The waterproofing applications waterproofing and protective coatings for all types of waterproofing situations. The present packaging material provides waterproof solutions for decks, exterior walls, roof, vapor/moisture barriers for in-between slabs, foundations, retaining walls, ocean-front walls, basement walls and floors, pool walls, planter boxes, Insulated Concrete Forms, under-tile, shower pans, inside elevated swimming pools, underwater repairs, waterfalls, tunnels, highway bridges, occupied under-mall area, potable water storage facilities, and chemically resistant waterproofing systems. In some embodiments, the packaging material may be used to form a waterproofing material (e.g., marine coatings, basement waterproofing material, foundation waterproofing material, below grade waterproofing material, roof waterproofing material, underwater and pool repair products, waterproofing membranes).

Figure 9C:
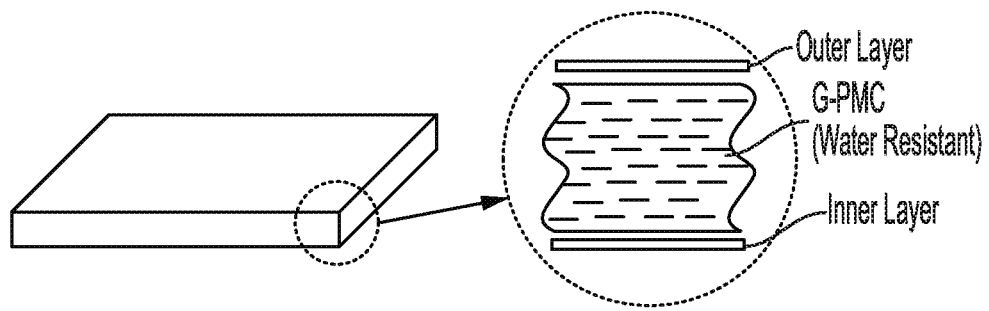
FIG. 9C shows an example of a waterproofing material formed from the packaging material.

FIG. 9C illustrates an example of a waterproofing material containing one or more layers of G-PMC. In one embodiment, the waterproofing material can have an inner layer, an outer layer, and a G-PMC containing layer sandwiched therebetween. The barrier resistance of G-PMC to water provides waterproofing property to such waterproofing material.

The disclosed packaging material provides significant property enhancements occur, including mechanical properties, barrier resistance, electrical conductivity, thermal conductivity, ballistics response, blast response, resistance of UV light degradation, etc. The superior mechanical properties of the present packaging material at reduced costs and is lightweight, which is particularly important in automotive, aerospace, infrastructure, and military applications. In some embodiments, an automotive, aircraft or aerospace part may be formed from the present packaging material.

In some embodiments, the disclosed packaging material may be used for packaging a racing fuel cell. The racing fuel cell has a rigid outer shell and flexible inner lining to minimize the potential for punctures in the event of a collision or other mishap resulting in serious damage to the vehicle. The disclosed packaging material provides a low cost and lightweight solution to meet the mechanical properties required by the racing fuel cell.

In some embodiments, the present packaging material may be used for food packaging. Currently, most of perfumes and colognes are packed in glass bottles which are subjected to breakage. Food packaging provides physical protection for the food; the food in the package may require protection from, among other things, shock, vibration, compression, temperature, bacteria, etc. Typical food packaging may include but are not limited to, trays, bags, boxes, cans, cartons, pallets, flexible packaging, etc. The present packaging material provides an excellent barrier protecting food from oxygen, water vapor, dust, UV light, etc. Permeation is a critical factor in design. The present packaging material with improved barrier resistance for the permeants such as oxygen or water vapor extends the shelf life of the food, and eliminate the breakage issue.

In some embodiments, the present packaging material may be used for perfume packaging. To preserve the integrity and quality of the product packaged within the packaging container, the packaging material must be compatible with all components of the product. For example, nail enamel is compatible with PP. However, PP does not have the barrier property required for keeping the solvent from permeating through the container. Also, for fragrance oils and colognes, PP is compatible with fragrance and alcohol, but it does not have the barrier property required for keeping the fragrance oils inside the container. In contrast, the container formed from the present packaging material is lightweight and capable of reducing the permeability of fragrance oils and/or solvent. The packaging material provides a barrier resistance to oxygen and protects fragrance from oxidization. Therefore, the present packaging material will likely extend the life of the perfume. Similar properties useful for packaging perfume that are also needed for packaging wines or liquors can be provided by the present packaging material containing G-PMC.

The present disclosure also provides a high-efficiency mixing method to transform a polymer composite that contains well-crystallized graphite particles into nano-dispersed single- or multi-layer graphene particles. The present disclosure additionally provides a method for mechanical functionalization of carbon fibers processed in situ with molten polymers to create reactive bonding sites at the ends of the fibers. The reactive sites react with the polymer to chemically bond the carbon fibers to the polymer.

Information relevant to how to make and use the presently claimed invention is disclosed in the following published patent applications, the disclosures of which are incorporated by reference in their entirety: US 2015/0267030 A1, US 2016/0083552 A1, and US 2017/0218141 A1.

The method involves in situ exfoliation of the graphite layers by compounding in a batch mixer or extruder that imparts repetitive, high shear strain rates. In both processes, longer mixing times provide enhanced exfoliation of the graphite into graphene nanoparticles within the polymer matrix composite (PMC). In addition, additives may be used to promote sufficient graphene/polymer bonding, thereby yielding a low-density graphene-reinforced polymer matrix composite (G-PMC). The method is low cost to produce a G-PMC that offers numerous property advantages, including improved mechanical properties such as increased specific stiffness and strength, enhanced electrical/thermal conductivity, and retention of optical transparency. Furthermore, these properties are tunable by modification of the process, vide infra.

The extent of graphene exfoliation will depend upon the total number of successive shear strain events applied to the graphite-polymer mixture. Increasing the number of successive shear strain events increases the degree of exfoliation. Thus, depending on the number and duration of in situ shear strain events, the method provides multi-layer graphene, graphene flakes, graphene platelets, few-layer graphene or single-layer graphene in a pure and uncontaminated form. Platelets have diamond-like stiffness and are used for polymer reinforcement. Graphene in any form increases polymer toughness by inhibiting crack propagation as reinforcement for polymers. Graphene may also be used as an additive to polymers and other compositions to provide electrical and thermal conductivity. The thermal conductivity of graphene makes it a desirable additive for thermal management for electronic devices and lasers.

Initially, low degrees of exfoliation (e.g., 10-20%) produce a significant increase in modulus at the expense of strain to fracture properties. As the degree of exfoliation increases, the modulus continues to increase at a non-linear rate with a further degrading of strain to fracture properties and a slight decrease in impact energy.

The graphene-reinforced polymer matrix composites produced in accordance with the present invention have at least a 20% improvement in modulus, impact energy or both, as compared to the neat polymers. For example, such improvements in impact energy include impact energy values of at least a 100% increase or of at least a 200% increase, as compared to the impact energy value of the neat polymer. And such improvements in modulus include modulus values of at least a 30% increase, of at least a 40% increase, of at least a 50% increase, of at least a 100% increase, of at least a 200% increase, or of at least a 500% increase, as compared to the modulus value of the neat polymer. Thus, modulus values for the G-PMCs are obtained that are on the level of carbon-fiber composites, except with a better impact energy absorption and at a significantly reduced cost.

In some embodiments, the fractured single- or multi-layer graphene nanoparticles resulted from in situ exfoliation and polymer in the binder or in the latex paint may form nanosized "thermoset-like" graphene nanoparticles/polymer clusters. Each mechanically exfoliated graphene nanoparticles may be bonded, preferably covalently, to with one or more polymer chains. The polymer chains may, in turn, form additional covalent bonds with more newly exfoliated graphene nanoparticles. These graphene nanoparticles may form more covalent bonds with additional polymers. Similarly, each polymer chain may be bonded, preferably covalently, or adhered to one or more mechanically graphene nanoparticles. This process can lead to nanosized clusters of covalent bonded graphene nanoparticles and polymers. These clusters have similar bonding structure as a thermoset block of polymers, in which molecules are chemically bonded together.

Depending on the extent of cross-linking between polymer and mechanically exfoliated graphene nanoparticles, the composite may include one or more graphene nanoparticles/polymer clusters that intersperse within the polymer matrix. Each graphene nanoparticles/polymer cluster may vary in sizes and shapes. Those graphene nanoparticles/polymer clusters contribute the structural rigidity as well as thermoset properties to the newly formed composite.

The term "graphene" refers to the name given to a single layer of carbon atoms densely packed into a fused benzene-ring structure. Graphene, when used alone, may refer to multi-layer graphene, graphene flakes, graphene platelets, and few-layer graphene or single-layer graphene in a pure and uncontaminated form.

Graphite, the starting material from which graphene is formed, is composed of a layered planar structure in which the carbon atoms in each layer are arranged in a hexagonal lattice. The planar layers are defined as having an "a" and a "b" axis, with a "c" axis normal to the plane defined by the "a" and "b" axes. The graphene particles produced by the inventive method have an aspect ratio defined by the "a" or "b" axis distance divided by the "c" axis distance. Aspect ratio values for the inventive nanoparticles exceed 25:1 and typically range between 50:1 and 1,000:1.

The graphene may be produced as a graphene-polymer mixture suitable for use as-is as a G-PMC that can be pelletized by conventional means for subsequent fabrication processing. Alternatively, higher concentrations of graphite may be used at the outset (such as, for example, from 20 to 60 wt % of the total composite weight) to provide a graphene-polymer masterbatch in concentrated form (containing both graphene and residual graphite) that can also be pelletized and then used to add graphene to polymer compositions as a reinforcing agent. As a further alternative, the graphene may be separated from the polymer, for example, by combustion or selective dissolution, to provide essentially pure particles of graphene.

Graphene-reinforced polymer composites according to the present invention typically contain from about 2 wt % to about 60 wt %, or from about 5 wt % to about 55 wt %, or from about 15 wt % to about 45 wt %, or from about 25 wt % to about 35 wt %, or from about 30 wt % to about 35 wt % of the total composite weight of particles selected from the group consisting of single-layer and multi-layer graphene nanoparticles less than 10 nanometers thick along a c-axis direction, partially exfoliated multi-layer graphene nanoparticles from 10 to 1,000 nanometers thick along the c-axis direction, graphite microparticles, and combinations of two or more thereof; wherein from about 5 wt % to about 95 wt %, of from about 10 wt % to less than about 50 wt %, or from about 10 wt % to about 45 wt %, or from about 15 wt % to about 40 wt %, or from about 20 wt % to about 35 wt %, or from about 25 wt % to about 30 wt % of the particles are single-layer graphene nanoparticles less than 10 nanometers thick along the c-axis direction, multi-layer graphene nanoparticles less than 10 nanometers thick along the c-axis direction, partially exfoliated multi-layer graphene nanoparticles from 10 to 1,000 nanometers thick along the c-axis direction, or a combination of two or more thereof. Polymer masterbatches typically contain from about 20 wt % to about 60 wt %, or from about 20 wt % to about 50 wt %, of the total composite weight of particles selected from the group consisting of single-layer and multi-layer graphene nanoparticles less than 10 nanometers thick along a c-axis direction, partially exfoliated multi-layer graphene nanoparticles from 10 to 1,000 nanometers thick along the c-axis direction, graphite microparticles, and combinations of two or more thereof; wherein from about 5 wt % to less than about 95 wt %, or, or from about 10 wt % to about 45 wt %, or from about 15 wt % to about 40 wt %, or from about 20 wt % to about 35 wt %, or from about 25 wt % to about 30 wt % of the particles are single-layer graphene nanoparticles less than 10 nanometers thick along the c-axis direction, multi-layer graphene nanoparticles less than 10 nanometers thick along the c-axis direction, partially exfoliated multi-layer graphene nanoparticles from 10 to 1,000 nanometers thick along the c-axis direction, or a combination of two or more thereof.

The availability of graphite-rich mineral deposits, containing relatively high concentrations (e.g., about 20%) of well-crystallized graphite, makes for a low cost and virtually inexhaustible source of raw material. As discussed below, the extraction of graphite particles from the mined material can be accomplished in a cost-effective manner. Synthetic graphite of high purity and exceptional crystallinity (e.g., pyrolytic graphite) may also be used for the same purpose. However, in this case, a batch mixing or extrusion compounding-induced exfoliation process creates a laminated composite, in which the graphene nanoparticles are oriented over a relatively large area. Such laminated composites may be preferred for specific applications.

For purposes of the present invention, graphite microparticles are defined as graphite in which at least 50 wt % of the graphite consists of multilayer graphite crystals ranging between 1.0 and 1000 microns thick along the c-axis of the lattice structure. Preferably, graphite microparticles ranging from 300 to 1,000 microns are used as the starting material, and more preferably, graphite microparticles ranging from 500 to 1,000 microns are used as the starting material. The larger the size of the graphite microparticles which are used as the starting material, then the larger the produced sheet of graphene will be when exfoliated. Expanded graphite may also be used. Expanded graphite is made by forcing the crystal lattice planes apart in natural flake graphite, thus expanding the graphite, for example, by immersing flake graphite in an acid bath of chromic acid, then concentrated sulfuric acid. Expanded graphite suitable for use in the present invention includes expanded graphite with opened edges at the bilayer level, such as MESOGRAF.

Mechanical exfoliation of graphite within a polymer matrix may be accomplished by a polymer processing technique that imparts repetitive high shear strain events to mechanically exfoliate graphite microparticles into multi- or single-layer graphene nanoparticles within the polymer matrix.

After high-shear mixing, the graphene flakes are uniformly dispersed in the molten polymer, are randomly oriented, and have high aspect ratio. The orientation of the graphene may be achieved by many different methods. Conventional drawing, rolling, and extrusion methods may be used to directionally align the graphene within the PMC fiber, filament, ribbon, sheet, or any other long-aspect shape. The method to fabricate and characterize a G-PMC is comprised of four main steps including:

(a) Extraction of crystalline graphite particles from a mineral source;

(b) Incorporation of the extracted graphite particles into a polymer matrix phase and conversion of the graphite-containing polymer into a graphene-reinforced polymer matrix composite (G-PMC) by a high-efficiency mixing/exfoliation process;

(c) Morphology analysis to determine the extent of mechanical exfoliation and distribution of multi-layer graphene and graphene nanoparticles; and (d) X-ray diffraction analysis to determine multi-layer graphene or graphene crystal size as a function of mechanical exfoliation.

Highly crystalline graphite may be extracted from graphite ore by a multi-step process, as described below.

Crushing: A drilled rod of graphite ore from the mine is placed in a vice and crushed.

Grinding: The crushed graphite ore is then ground by mortar and pestle.

Size Reduction: The ground graphite ore is placed in a sieve with a 1-mm mesh size and size reduced. Larger pieces that do not pass through the screen may be ground by mortar and pestle and then size reduced through the 1-mm mesh size again. Eventually, all of the material is passed through the 1-mm mesh size to obtain graphite ore powder.

Density Separation by Water

The 1-mm sized powder is placed in a column filled with water and agitated until a clear separation formed between the more dense portions of the solids and the less dense portions. The density of graphite (2.09-2.23 $g/cm^3$) is closer to the density of water (1 $g/cm^3$), than that of silicon (2.33 $g/cm^3$). The uppermost materials are siphoned off with the water and then dried. The dried powder graphite is referred to as Separated Mineral Graphite (SMG).

In commercial practice, very large crushing and grinding machines are available to produce tonnage quantities of mixed powders, from which the graphite component can be separated by standard floatation methods.

Thus, one aspect of the invention includes an in situ exfoliation method of fabricating a G-PMC. In this method, a polymer that is uniformly blended with micron-sized crystalline graphite particles is subjected to repeated compounding-element processing during batch mixing or extrusion at a temperature where the polymer adheres to the graphite particles. Typical polymers have a heat viscosity (without graphite) greater than 100 cps at the compounding temperature. The compounding temperature will vary with the polymer and can range between room temperature (for polymers that are molten at room temperature) and 600° C. Typical compounding temperatures will range between 180° C. and 400° C.

Thus, the effect of each compounding pass is to shear-off graphene layers one after the other, such that the original graphite microparticles are gradually transformed into a very large number of graphene nanoparticles. After an appropriate number of such passes, the final result is a uniform dispersion of discrete graphene nanoparticles in the polymer matrix phase. Longer mixing times or a higher number of passes through the compounding elements provides smaller graphite crystal size and enhanced exfoliation of graphite into graphene nanoparticles within the polymer matrix; however, the shear events should not be of a duration that would degrade the polymer.

As the content of graphene nanoparticles increases during multi-pass extrusion, the viscosity of the polymer matrix increases due to the influence of the growing number of polymer/graphene interfaces. To ensure continued refinement of the composite structure, the extrusion parameters are adjusted to compensate for the higher viscosity of the composite.

Automated extrusion systems are available to subject the composite material to as many passes as desired, with mixing elements as described in U.S. Pat. No. 6,962,431, and equipped with a re-circulating stream to direct the flow back to the extruder input. Since processing of the graphene-reinforced PMC is direct and involves no handling of graphene particles, fabrication costs are low.

In order to mechanically exfoliate graphite into multi-layer graphene and/or single-layer graphene, the shear strain rate generated in the polymer during processing must cause a shear stress in the graphite particles greater than the critical stress required to separate two layers of graphite, or the interlayer shear strength (ISS). The shear strain rate within the polymer is controlled by the type of polymer and the processing parameters, including the geometry of the mixer, processing temperature, and speed in revolutions per minute (RPM).

Thus, one aspect of the invention is directed to a graphene-reinforced polymer matrix composite comprising an essentially uniform distribution in a thermoplastic polymer matrix of from about 2 wt % to about 60 wt %, or from about 5 wt % to about 55 wt %, or from about 15 wt % to about 45 wt %, or from about 25 wt % to about 35 wt %, or from about 30 wt % to about 35 wt % of the total composite weight of particles selected from the group consisting of single-layer and multi-layer graphene nanoparticles less than 10 nanometers thick along a c-axis direction, partially exfoliated multi-layer graphene nanoparticles from 10 to 1,000 nanometers thick along the c-axis direction, graphite microparticles, and combinations of two or more thereof; wherein from about 5% wt % to about 95 wt %, or from about 10 wt % to less than about 50 wt %, or from about 10 wt % to about 45 wt %, or from about 15 wt % to about 40 wt %, or from about 20 wt % to about 35 wt %, or from about 25 wt % to about 30 wt % of the particles are single-layer graphene nanoparticles less than 10 nanometers thick along the c-axis direction, multi-layer graphene nanoparticles less than 10 nanometers thick along the c-axis direction, partially exfoliated multi-layer graphene nanoparticles from 10 to 1,000 nanometers thick along the c-axis direction, or a combination of two or more thereof.

According to one embodiment, the graphene-reinforced polymer matrix composite contains an essentially uniform distribution in a thermoplastic polymer matrix of from about 2 wt % to about 10 wt %, or from about 2 wt % to about 9 wt %, or from about 3 wt % to about 8 wt %, or from about 4 wt % to about 7 wt %, or from about 5 wt % to about 6 wt %, or from about 8.9 wt % to about 10 wt % of the total composite weight of particles selected from the group consisting of single-layer and multi-layer graphene nanoparticles less than 10 nanometers thick along a c-axis direction, partially exfoliated multi-layer graphene nanoparticles from 10 to 1,000 nanometers thick along the c-axis direction, graphite microparticles, and combinations of two or more thereof; wherein from about 5 wt % to about 95 wt %, or form about 10 wt % to less than about 50 wt %, or from about 10 wt % to about 45 wt %, or from about 15 wt % to about 40 wt %, or from about 20 wt % to about 35 wt %, or from about 25 wt % to about 30 wt % of the particles are single-layer graphene nanoparticles less than 10 nanometers thick along the c-axis direction, multi-layer graphene nanoparticles less than 10 nanometers thick along the c-axis direction, partially exfoliated multi-layer graphene nanoparticles from 10 to 1,000 nanometers thick along the c-axis direction, or a combination of two or more thereof.

In one embodiment of the graphene-reinforced polymer matrix composites as disclosed above, the graphite may be doped with other elements to modify the surface chemistry of the exfoliated graphene nanoparticles. The graphite may be expanded graphite. Specifically and preferably, surface chemistry or nano structure of the dispersed graphite may be modified to bond with the polymer matrix to increase strength and stiffness of the graphene-reinforced composite. In one embodiment, directional alignment of the graphene nanoparticles is used to obtain one-, two- or three-dimensional reinforcement of the polymer matrix phase. In one embodiment, the polymer chains are inter-molecularly cross-linked by single- or multi-layer graphene sheets having carbon atoms with reactive bonding sites on the edges of said sheets.

The above graphene-reinforced polymer matrix composite may further comprise at least one additive selected from fillers, dyes, pigments, mold release agents, processing aids, carbon fiber, compounds that improve electrical conductivity, and compounds that improve thermal conductivity.

Another aspect of the invention includes an automotive, aircraft, watercraft or aerospace part formed from the graphene-reinforced polymer matrix composites disclosed above. In one embodiment, the part is an engine part.

Yet another aspect of the invention includes a method of preparing a graphene-reinforced polymer matrix composite, such as those described herein, wherein the method comprises the steps of:

(a) distributing graphite microparticles into a molten thermoplastic polymer phase comprising one or more of said matrix polymers; and (b) applying a succession of shear strain events to the molten polymer phase so that the matrix polymers exfoliate the graphite successively with each event until at least 10 wt % to less than 50 wt %, or from about 10 wt % to about 45 wt %, or from about 15 wt % to about 40 wt %, or from about 20 wt % to about 35 wt %, or from about 25 wt % to about 30 wt %, of the graphite is exfoliated to form a distribution in the molten polymer phase of single-layer and multi-layer graphene nanoparticles less than 10 nanometers thick along a c-axis direction, and multi-layer graphene nanoparticles from 10 to 1,000 nanometers thick along a c-axis direction.

In one embodiment, the graphite particles are prepared by crushing and grinding a graphite-containing mineral to millimeter-sized dimensions, reducing the millimeter-sized particles to micron-sized dimensions, and extracting micron-sized graphite particles from the graphite-containing mineral. In one embodiment, the graphite particles are distributed into the molten polymer phase using a single screw extruder with axial fluted extensional mixing elements or spiral fluted extensional mixing elements. In one embodiment, the graphite-containing molten polymer phase is subjected to repeated extrusion to induce exfoliation of the graphitic material and form the essentially uniform dispersion with the single- and multi-layer graphene nanoparticles in the thermoplastic polymer matrix.

In another embodiment, a cross-linked G-PMC is formed by a method including distributing graphite microparticles into a molten thermoplastic polymer phase comprising one or more molten thermoplastic polymers. A succession of shear strain events, as illustrated in the examples, is then applied to the molten polymer phase so that the molten polymer phase exfoliates the graphene successively with each event until a lower level of graphene layer thickness is achieved, after which point ripping and tearing of exfoliated multilayer graphene sheets occurs and produces reactive edges on the multilayer sheets that react with and cross-link the thermoplastic polymer.

Thus, activated graphene is formed as the graphene fractures across the basal plane and offers potential sites for cross-linking to the matrix or attaching other chemically unstable groups for functionalization. Therefore, the cross-linking is performed under exclusion of oxygen, preferably under an inert atmosphere or a vacuum, so that the reactive edges do not oxidize or otherwise become unreactive. Forming covalent bonds between graphene and the matrix significantly increases the composite strength. Polymers that cross-link when subjected to the method of the present invention include polymers subject to degradation by ultraviolet (UV) light. This includes polymers containing aromatic, e.g., benzene rings, such as polystyrene, polymers containing tertiary carbons, such as polypropylene and the like, polymers containing backbone oxygens, such as poly (alkylene oxides), and the like.

In another embodiment, the cross-linked G-PMC can be ground into particles and blended with non-cross-linked host polymers to serve as toughening agents for the host polymer. The non-cross-linked polymer acquires the properties of the cross-linked polymer because of chain entanglement between the two polymer species. The present invention therefore also includes cross-linked polymers of the present invention in a particulate form that can be blended with other polymers to form a high strength composite. In one embodiment, cross-linked polystyrene and polymethyl methacrylate (PMMA) particles of the present invention can be used as toughening agents for host polymers. Compositions according to the present invention can include host thermoplastic polymers toughened with between 1 and 75% by weight of the cross-linked polymer particles of the present invention. In one embodiment, the host polymers are toughened with between about 10 and about 50% by weight of the cross-linked polymer particles.

The present disclosure also includes a method to mechanical functionalization of carbon fibers processed in situ with molten polymers to create reactive bonding sites at the ends of the fibers. The reactive sites react with the polymer to chemically bond the carbon fibers to the polymer. This can be achieved with a variety of carbon fibers, including single or multi-walled carbon nanotubes and standard micron-sized carbon fibers. It works well in conjunction with a variety of polymers that possess chemical groups having double bonds (carbon-carbon double bonds, carbon-oxygen double bonds, etc.) or various tertiary carbon bonds Similar observations of good bonding at sites of broken covalent graphite and graphene bonds have been made while mechanically exfoliating graphite into graphene in situ with polymers.

The fibers are broken or cut while in molten polymers during melt processing, and this can be done either by having a specially designed cutting tool in the melt processing equipment, or through high shear in the melt processing, or by a combination of the two. The opening up of new fiber ends by breaking or cutting the fibers while surrounded by liquid polymers introduces dangling bonds having unfilled valencies (free radicals) which provide reactive sites on the fiber ends, which represent sites for strong bonding, such as covalent bonding, by the polymers having the attributes mentioned above. The resulting solid composites have improved mechanical properties upon cooling, and the optimal fiber length, and, subsequently, the cost will be greatly reduced by this bonding.

In one aspect, the present invention provides a high-efficiency mixing method to transform a polymer composite that contains carbon fibers into broken carbon fibers having reactive ends or edges, by compounding in a batch mixer or extruder that imparts repetitive, high shear strain rates. The method is low cost to produce a CF-PMC that offers numerous property advantages, including increased specific stiffness and strength, enhanced electrical/thermal conductivity and retention of optical transparency. Furthermore, these properties are tunable by modification of the process, vide infra. In some cases, an inert gas or vacuum may be used during processing. Other advantages of in situ carbon fiber breaking are that it avoids handling size reduced carbon fibers, and also avoids the need to disperse them uniformly in the polymer matrix phase. Superior mixing produces finer composite structures and very good particle distribution.

Carbon fiber-reinforced polymers according to the present invention typically contain between about 0.1 and about 30 wt % carbon fibers or nanotubes. More typically, the polymers contain between about 1.0 and about 10 wt % carbon fibers or nanotubes. According to one embodiment, the carbon fiber-reinforced polymer matrix composite contains from about 1 wt % to about 10 wt %, or from about 2 wt % to about 9 wt %, or from about 3 wt % to about 8 wt %, or from about 4 wt % to about 7 wt %, or from about 5 wt % to about 6 wt % carbon fibers or nanotubes (based on the total composite weight). Polymer masterbatches typically contain up to about 65 wt % carbon fibers or nanotubes, and more typically between about 5 and about 50 wt % carbon fibers or nanotubes. According to one embodiment, the masterbatches contain between about 10 and about 30 wt % carbon fibers or nanotubes.

Mechanical functionalization of carbon fibers within a polymer matrix may be accomplished by a polymer processing technique that imparts repetitive high shear strain events to mechanically break the carbon fibers within the polymer matrix. After high-shear mixing, the mechanically size reduced carbon fibers are uniformly dispersed in the molten polymer, are randomly oriented, and have high aspect ratio.

In one embodiment, graphite microparticles are also added to the molten polymer and are mechanically exfoliated into graphene via the succession of shear strain events. Graphite microparticles are generally no greater than 1,000 microns in size, and the extent of exfoliation of the graphite microparticles can generally be from 1 to 100%, resulting in a graphene to graphite weight ratio ranging from 1:99 to 100:0. Such an exfoliation method is disclosed in US 2015/0267030, the entire disclosure of which is incorporated herein by reference.

The amount of graphite added to the molten polymer can be an amount up to and including the amount of carbon fibers, and nanotubes added, provided that the total content of carbon fibers, nanotubes and resulting graphene or mixture of graphite and graphene does not exceed 65 wt %. Typically, the weight ratio of graphene, or a mixture of graphite and graphene, to carbon fibers and/or nanotubes ranges between 5:95 and 50:50, and more typically between 25:75 and 33:67.

It is understood that the examples and embodiments described herein are for illustrative purposes only and that various modifications or changes in light thereof will be suggested to persons skilled in the art and are to be included within the spirit and purview of this application and scope of the appended claims.

III. EXAMPLES

Example 1

G-PMC Preparation

Materials

The four materials used in these examples include flake graphite (manufactured by Asbury Carbons), polyether ether ketone (PEEK), general purpose polystyrene (PS), and fractional melt flow polyethylene (HDPE). PEEK has a specific gravity of 1.32, a melt mass-flow rate (MFR) of 3.0 g/10 min at 400° C. and 2.16 kg, a flexural modulus of 3.8 GPa, a flexural strength of 128 MPa, and a tensile modulus of 4 GPa. PS has a specific gravity of 1.04, an MFR of 7.0 g/10 min at 200° C. and 5 kg, a flexural modulus of 3.1 GPa, a flexural strength of 57 MPa, and a tensile modulus of 3.4 GPa. HDPE has a specific gravity of 0.952, an MFR of 0.06 g/10 min at 190° C. and 2.16 kg, a flexural modulus of 1.1 GPa, a flexural strength of 22 MPa, and a tensile modulus of 1.2 GPa.

Preparation of Samples

Using a high shear melt-processing method, highly loaded G-PMCs (i.e., masterbatches) were produced with good distribution in PEEK (50 wt % graphite/graphene, 50G-PEEK), PS (35 wt % graphite/graphene, 35G-PS) and HDPE (35 wt % graphite/graphene, 35G-HDPE). To determine the masterbatch properties of these highly loaded G-PMCs, each one was diluted with the same grade polymer to obtain G-PMCs with lower graphite/graphene loading (i.e., with a lower wt % of graphite/graphene).

Prior to processing the diluted samples, the PEEK and 50G-PEEK were dried to remove adsorbed water; the PS and 35G-PS were dried to remove adsorbed water, and the HDPE and 35G-HDPE were dried to remove adsorbed water. The components were then dry-blended, and the mixture added directly into the hopper of a molding machine with a novel screw design. The components were then processed under a nitrogen blanket and various pressures depending on the matrix. A PID temperature-controlled stainless steel mold was used for PEEK-based composites, and ASTM D638 Type 1 tensile specimens with cross-sectional dimensions of approximately 3.4 mm by 12.5 mm were produced. The same processing method was used to produce PEEK, PS and HDPE specimens, as controls for comparison with the G-PMCs.

After processing, graphene-reinforced polymer matrix composites consisting of 2 wt. %, 5 wt % and 10 wt % of graphite/graphene in a PEEK matrix were produced. These composites are herein referred to as 2G-PEEK, 5G-PEEK, and 10G-PEEK, respectively. Similarly, in PS matrices, 1.8 wt. %, 4.4 wt % and 8.9 wt % of graphite/graphene in a PS matrix were also produced. These composites are herein referred to as 1.8G-PS, 4.4G-PS, and 8.9G-PS, respectively. And in HDPE matrices, 1.8 wt. %, 4.4 wt % and 8.9 wt % of graphite/graphene in an HDPE matrix were produced. These composites are herein referred to as 1.8G-HDPE, 4.4G-HDPE and 8.9G-HDPE, respectively.

Example 2

Characterization of G-PMCs

The morphology and mechanical properties of the composites were characterized by scanning electron microscopy (SEM), flexural mechanical testing and tensile mechanical testing.

Flexural mechanical properties of the composites were characterized using an MTS QTest/25 Elite Controller with a 500 N for PS and HDPE composites, and a 5 kN load cell at a cross-head rate of 1.3 mm/min and a support span of 49 mm, in accordance with ASTM D790.

Tensile mechanical properties of the composite were characterized using an MTS QTest/25 Elite Controller with a 25 kN load cell at a cross-head rate of 1.41 mm/min, in accordance with ASTM D638.

SEM Analysis

The morphology of graphene, PEEK, 2G-PEEK, and 5G-PEEK were analyzed via scanning electron microscopy (SEM). SEM samples of molded specimens were prepared by cryogenic fracture. The fractured surfaces were mounted on aluminum studs, gold coated to a thickness of 5 nm, and placed under vacuum overnight prior to observation. A Zeiss Sigma Field Emission SEM was used with both in-lens and secondary electron detectors to observe dispersion/distribution of graphene within PEEK and graphene particle-matrix interactions. An accelerating voltage of 5 keV was used for all observations.

Figure 10A:
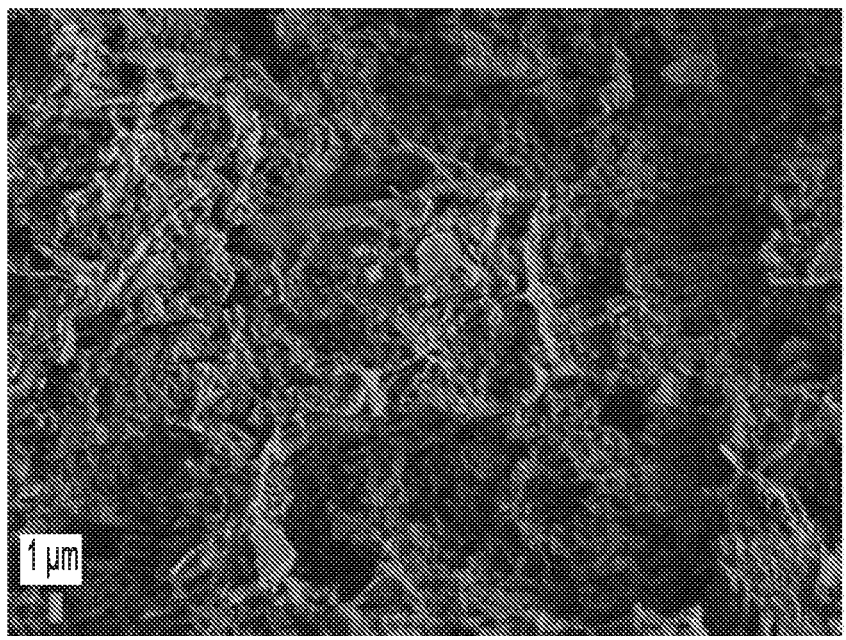
FIG. 10 shows the morphology of 10G-PEEK (left) and 10G-PS (right).
Figure 10B:
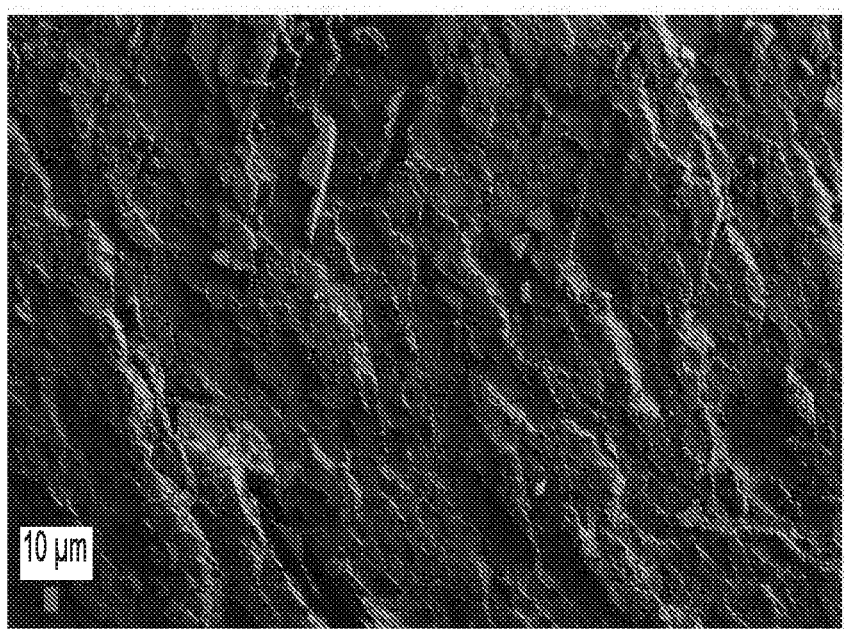

In FIG. 10, the morphology of 10G-PEEK (left) and 10G-PS (right) is shown in SEM images. Good distribution of the graphite/graphene is visible in both of these composites, demonstrating the successful use of a highly loaded masterbatch in creating a uniform composite.

Example 3

Processing and Characteristics of CNT-Reinforced Nylon 66 Composites

A polymer-carbon nanotube composite (PCNC) differs from a conventional carbon-fiber composite in that there is a much higher interface area between reinforcing carbon and polymer matrix phases. It has been proposed that introducing a uniform distribution of carbon nanotubes (CNTs) into a polymer matrix should yield property enhancements that go beyond that of a simple rule of mixtures. The challenge is to take full advantage of the exceptional properties of CNTs in the composite material.

Carbon nanotubes are considered to be ideal reinforcing material for polymer matrices because of their high aspect ratio, low density, remarkable mechanical properties, and good electrical/thermal conductivity. One of the matrices that has been studied is commercially important Nylon 66. However, property improvements have not been significant to date, apparently due to poor interfacial CNT/polymer bonding and severe CNT agglomeration.

These obstacles have now been overcome by utilizing a new processing route that involves high-shear mixing in a molten polymer to induce de-agglomeration and dispersal of CNTs while enhancing adhesive bonding and covalent bonding by creating new sites on the CNTs to which the polymer chains can bond. An attempt is also being made to increase impact energy absorption by forming a biphasic composite, comprising a high fraction of strong CNT-reinforced Nylon particles uniformly dispersed in a tough Nylon matrix.

A carbon nanotube (CNT) consists of a sheet of hexagonal-bonded carbon atoms rolled up to form a tube. A single-walled carbon nanotube (SWCNT) comprises a single layer of this tubular structure of carbon atoms. However, the structure of a multi-walled carbon nanotube (MWCNT) is still open to some debate. In one model, an MWCNT is imagined to be a single graphene sheet rolled up into a scroll. In another model, an MWCNT is considered to be made of co-axial layers of helically-aligned carbon hexagons, with matching at the joint lines, leading to a nested-shell structure. In yet another model, a combination of scroll-like and nested-shell structures has been proposed.

It is known that increases in elastic modulus and strength of Nylon-CNT composite resulted from making small additions of CNTs to polymer matrices. While Van der Waals bonding dominates interactions between CNTs and polymers, adhesion in some CNT composites also occurs via covalent bonds, which has been shown to play a role in reinforcement of CNT composites.

Measurements by AFM of the pull-out force necessary to remove a given length of an individual MWCNT embedded in polyethylene-butene copolymer has demonstrated covalent bonding between the outer layer of an MWCNT and the polymer matrix. It also showed that the polymer matrix in the near vicinity to the interface behaved differently than the polymer in bulk, which is attributed to the outer diameter of a CNT having the same magnitude as the radius of gyration of the polymer chain.

Because of the tendency of CNTs to agglomerate, the difficulty of aligning them in the matrix and often poor load transfer, there have been a number of reported attempts to produce composites using different polymer matrix phases.

The present invention provides remarkable improvements in stiffness and strength of a CNT-reinforced Nylon composite, vide infra. The composites are characterized by an increase in impact energy absorption. Processing parameters which achieve superior mechanical properties and performance are provided herein.

Example 4

G-PMC Film Preparation and Characterization

1. Sample Preparation

Materials (a) Attain well-crystallized mined graphite of high purity and (b) HDPE.

(c) Prepare G-PMCs by the high shear melt-mixing process.

Prior to melt processing, graphite will be dried in a furnace to remove volatiles. Dried graphite at 35 wt % will be dry-blended with HDPE followed by high shear melt-processing using a molding machine and tensile specimens produced. To achieve a high degree of graphite exfoliation, the components are processed over ten processing cycles to produce a 35G-HDPE masterbatch. Then, HDPE will be dry blended with 35G-HDPE master batch and melt-processed using the same high shear melt-processing method to produce samples containing 0, 1, 5, 10, 20, and 35 wt % graphite and tensile specimens produced for each concentration, HDPE, 1G-HDPE, 5G-HDPE, 10G-HDPE, 20G-HDPE, and 35G-HDPE.

2. Film Preparation

Each sample prepared in 1.2 (0, 1, 5, 10, 20, and 35 wt % graphite in HDPE) will be granulated and melt-processed using an extruder with lip die attached to produce thin films. The proper cross section will be cut out for subsequent permeation testing.

3. Permeation Testing

Permeation of small gases and fuels through HDPE, 1G-HDPE, 5G-HDPE, 10G-HDPE, 20G-HDPE, and 35G-HDPE samples will be measured to determine the effect of GNF concentration on permeability through HDPE, and the optimum concentration will be selected for secondary processing to align GNFs within HDPE to further decrease permeation rates.

3.1. Small Gases (Oxygen, Carbon Dioxide, and Water Vapor)

Oxygen

Permeation of oxygen will be measured using a Mocon OX-TRAN (or similar), according to ASTM D3985 Standard Test Method for Oxygen Gas Transmission Rate Through Plastic Film and Sheeting Using a Coulometric Sensor, ASTM F1927 Standard Test Method for Determination of Oxygen Gas Transmission Rate, Permeability and Permeance at Controlled Relative Humidity Through Barrier Materials Using a Coulometric Detector, or similar test method well-documented in the literature.

ASTM D3985 will determine the steady-state rate of transmission of oxygen gas through G-PMC films and control polymer films and provide determination of (1) oxygen gas transmission rate (OTR) and (2) the permeance of the film to oxygen gas (PO2). The average of several specimens per sample will be reported. ASTM F1927 will determine the steady-state rate of transmission of oxygen gas, at a given temperature and % RH level, through G-PMC film and control polymer film and provide determination of (1) oxygen gas transmission rate (O2GTR), (2) the permeance of the film to oxygen gas (PO2), and (3) the permeation coefficient of the film to its thickness (P"O2). The average of several specimens per sample will be reported.

Carbon Dioxide

Permeation of carbon dioxide will be measured for G-PMC films and control polymer films, according to ISO 2556 Plastics—Determination of the gas transmission rate of films and thin sheets under atmospheric pressure—Manometric method or equivalent method. The average of several specimens per sample will be reported.

Water Vapor

Permeation of water vapor will be measured for G-PMC films and control polymer films, according to ASTM E96 Standard Test Methods for Water Vapor Transmission of Materials or equivalent method. The water vapor transmission (WVT) for each sample will be reported as the average of several specimens.

3.2. Fuels

Fuel permeation will be performed, according to SAE International J2665 cup weight loss procedure (or equivalent). Cups containing the fuel will be sealed with G-PMC films and control polymer films and mass loss due to diffusion monitored every 24 hours. The cups are stored in a furnace at approximately 60° C. in a nitrogen blanket to flush out flammable vapors. The average of several specimens per sample will be reported.

4. G-PMC Optimization and Testing

After analyzing permeation results, the optimum graphite concentration in HDPE will be determined and subject to secondary processing to orient GNFs within HDPE, which should further reduce permeation. A Brabender heated two-roll mill (or equivalent) will be used to potentially align GNFs 90 degrees to the through-plane to further decrease permeability. Aligned G-HDPE and HDPE samples will be subject to permeation testing.

Example 5

Effect of Mixing Time

Graphite and high-density polyethylene (HDPE) were combined using a uniform, high shear melt-mixing method to exfoliate graphite into graphene nanoflakes (GNFs) within HDPE to produce G-HDPE nanocompo sites. The barrier resistance to small gases was determined through these G-HDPE nanocomposite films using two different methods. Firstly, the effect of mixing time was investigated by adding 0.5 wt % graphite to HDPE and melt-blended for different mixing times, including 30, 60, 90 and 120 minutes. Secondly, the effect of GNF concentration was investigated by adding 0, 1, 2, 5, 10, 20, 25, 30, and 35 wt % graphite to HDPE and each melt-mixed for 90 minutes. These samples are labeled as % G-HDPE, for example, 35G-HDPE refers to 35 wt % graphite exfoliated to form GNFs within HDPE. HDPE was processed alone as a control at the same mixing times of 30, 60, and 90 minutes. The components were processed at a temperature range of 205° C. to 235° C. The extrudate was compression molded and pressed into films at a temperature of 190° C. and a pressure of 11 MPa for about 20 seconds. Samples were removed from the blocks and allowed to cool at room temperature while still wrapped in aluminum foil. The target film thickness was between 75-200 µm.

Mined graphite was sourced from Asbury Carbons (mills grade 3627 with 99.2% purity), and HDPE was injection molding grade (melt flow of 4.8 g/10 min at 190° C.) and has a melt temperature of 132° C. Prior to processing graphite and HDPE were dried in the furnace at 400° C. for four hours and at 70° C. for 30 minutes, respectively.

Figures 11A, 11B, 11C, 11D:
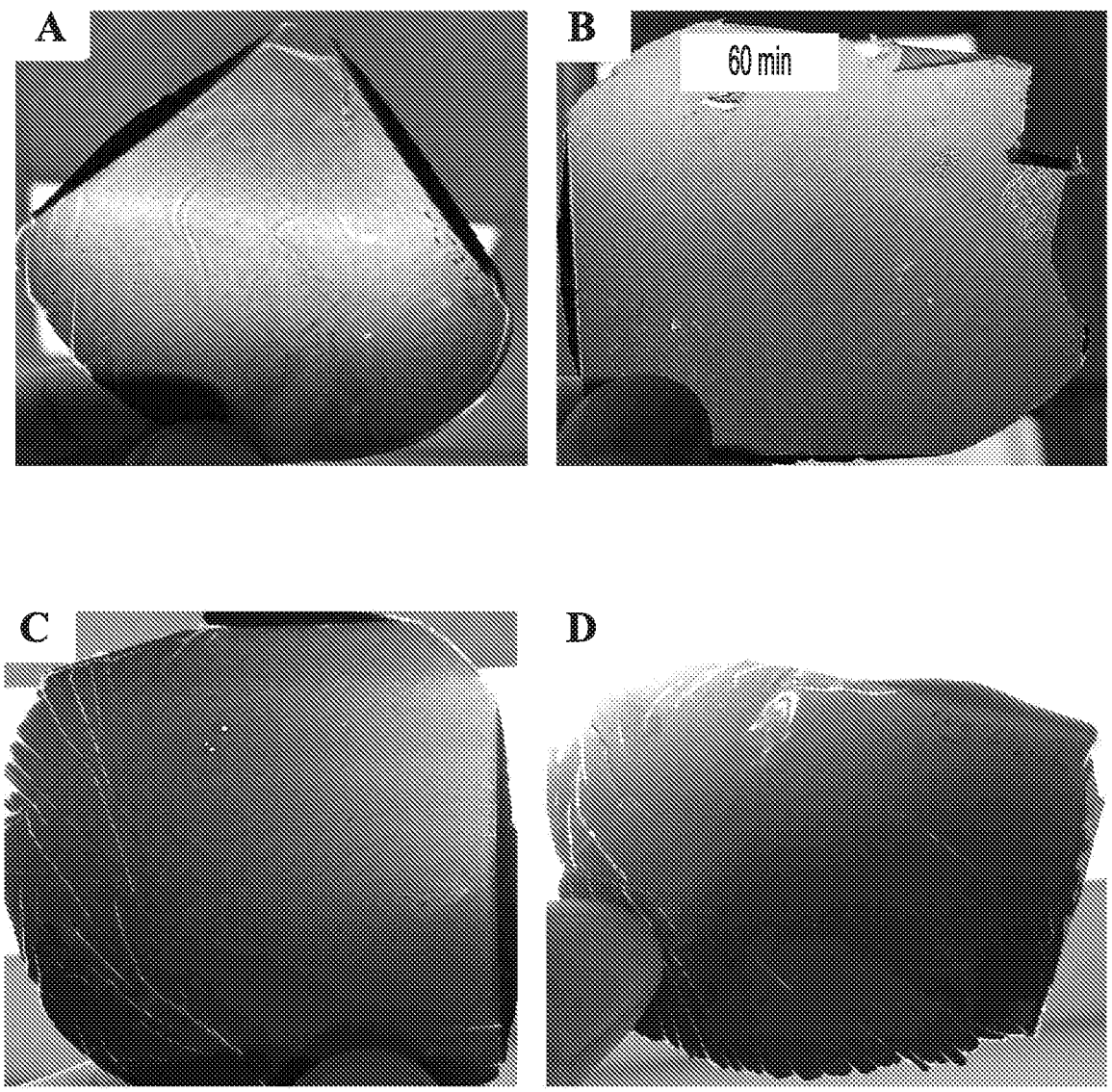
FIGS. 11A, 11B, 11C, and 11D (collectively "FIG. 11") show pictures of 0.5G-HDPE films compression molded after high shear melt-mixing at mixing times of 30 minutes (FIG. 11A), 60 minutes (FIG. 11B), 90 minutes (FIG. 11C), and 120 minutes (FIG. 11D).
Figures 12A, 12B, 12C, 12D:
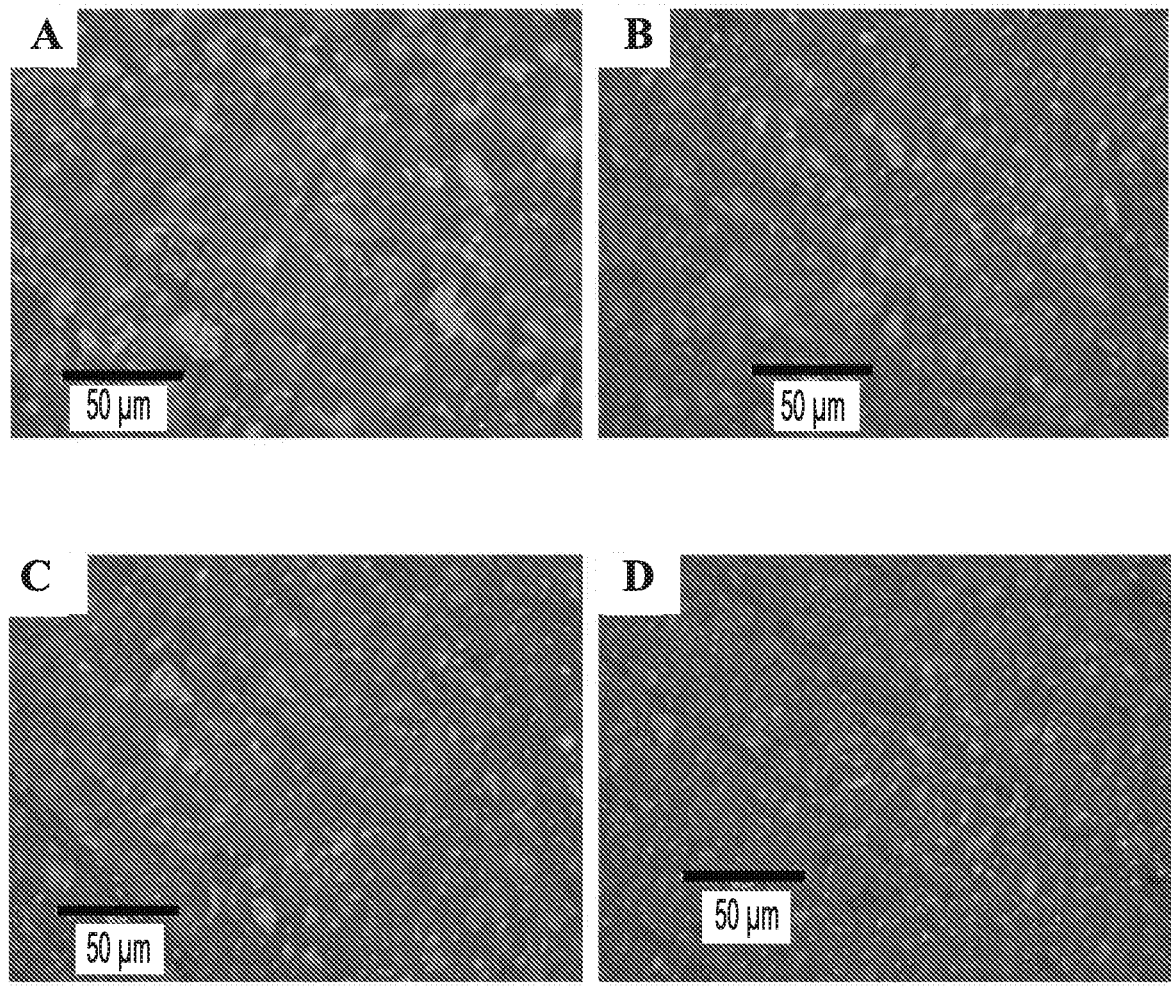
FIGS. 12A, 12B, 12C, and 12D (collectively "FIG. 12") show optical microscope images of 0.5G-HDPE films compression molded after uniform, high shear melt-mixing at mixing times of 30 minutes (FIG. 12A), 60 minutes (FIG. 12B), 90 minutes (FIG. 12C), and 120 minutes (FIG. 12D).

Pictures of compression molded 0.5G-HDPE films are shown in FIG. 11, after high shear melt mixing times of (A) 30 minutes, (B) 60 minutes, (C) 90 minutes, and (D) 120 minutes. The films appear uniform without any visible GNF particles. Optical microscopy images show good distribution of GNF particles within HDPE and show increasing uniformity in GNF particle size with an increased mixing time of 120 minutes (FIG. 12). This view shows GNF particle diameter within the AB plane.

Oxygen permeation through 0.5G-HDPE films melt-mixed for 30, 60, 90, and 120 minutes was determined at Mocon Laboratory using an Oxtran 2/21 Oxygen Permeability Instrument and run until steady state oxygen transmission was achieved, according to ASTM D3985. Samples were tested at a temperature of 23° C. with dry oxygen at a partial pressure differential of 760 mmHg, against a carrier gas of 98% Nitrogen, 2% Hydrogen. Sample area was either 5 cm$^2$ or 20 cm$^2$, depending on thickness uniformity.

Figure 13:
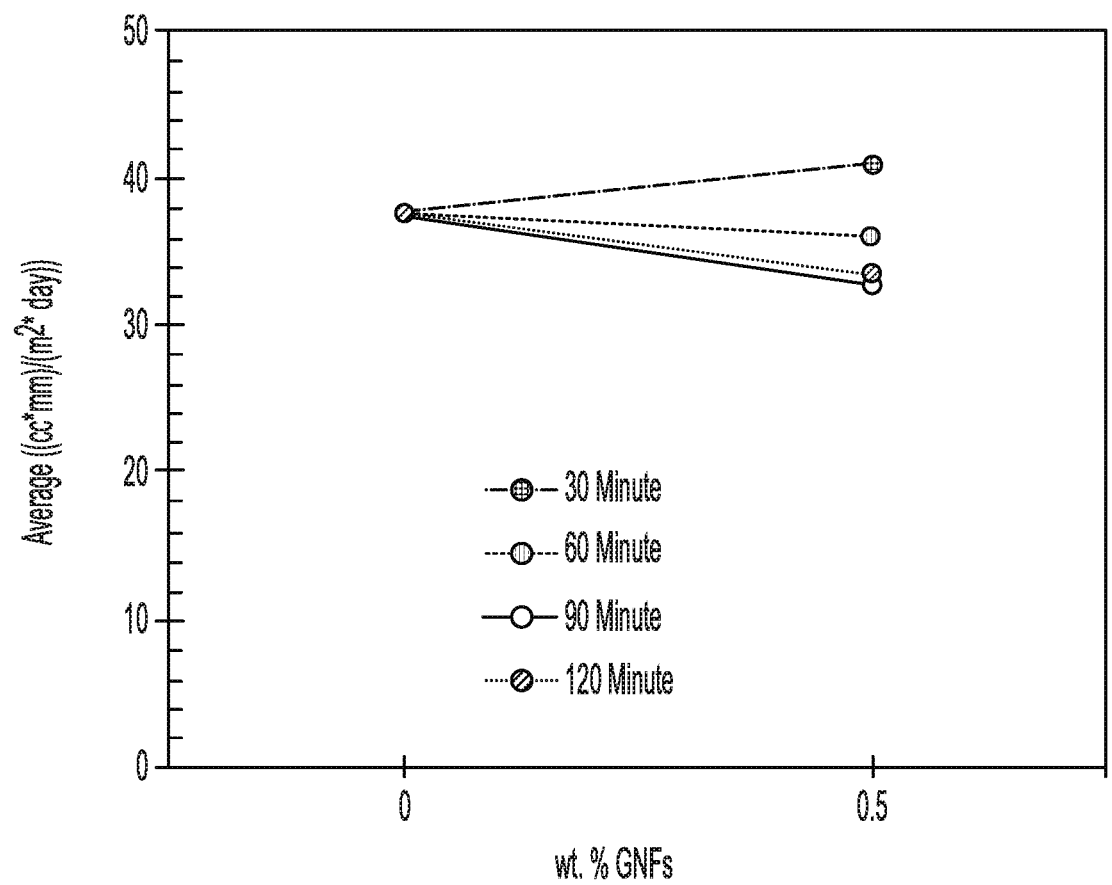
FIG. 13 shows oxygen permeation measured through 0.5G-HDPE films after 30, 60, 90, and 120 minutes of mixing.

Oxygen permeation results for 0.5G-HDPE films are shown in FIG. 13. The average (cc×mm)/(2× day) oxygen measured decreases with the addition of 0.5 wt % GNFs to HDPE after 60, 90, and 120 minutes of mixing, as the degree of graphite exfoliation increases (i.e., increased size reduction of the graphite particles). With the addition of only 0.5 wt % graphite to HDPE and melt-mixing for 90 minutes to exfoliate graphite into GNFs, the permeation decreases by 13%, as compared with HDPE, and indicates a high degree of graphite exfoliation to GNFs and good GNF-matrix interaction.

Example 6

Effect of GNF Concentration

Figure 14A:
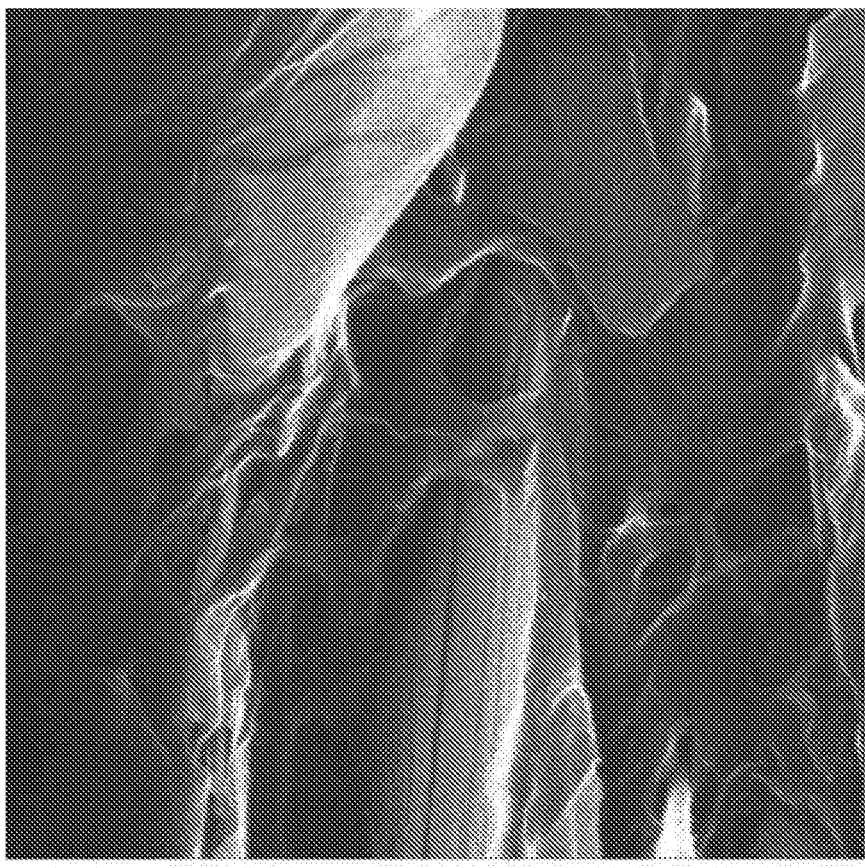
FIGS. 14A, 14B, and 14C (collectively "FIG. 14") show SEM micrographs of 35G-HDPE nanocomposite films prepared by uniform, high shear melt-mixing of 35 wt % graphite exfoliated into GNFs within HDPE for a mixing time of 90 minutes followed by compression molding (FIG. 14A) 2 μm and (FIG. 14B) 200 nm scale bars.
Figure 14B:
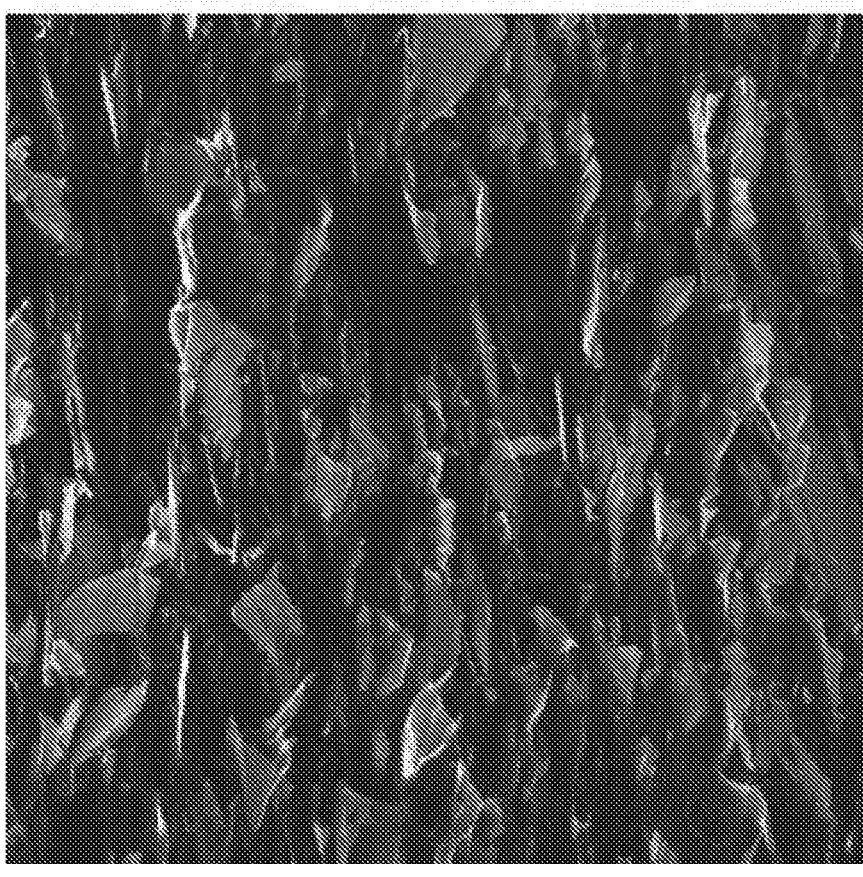

The morphology of 35G-HDPE nanocomposite films after 90 minutes of uniform, high shear melt mixing followed by compression molding is shown in FIGS. 14A and 14B using field emission scanning electron microscopy of the cold fractured film surface. In FIG. 14A, the GNFs appear well-distributed within HDPE and aligned parallel to one another. In FIG. 14B, there is evidence of good particle-matrix interaction, as the HDPE is wetting the GNF surfaces and edges.

Figure 14C:
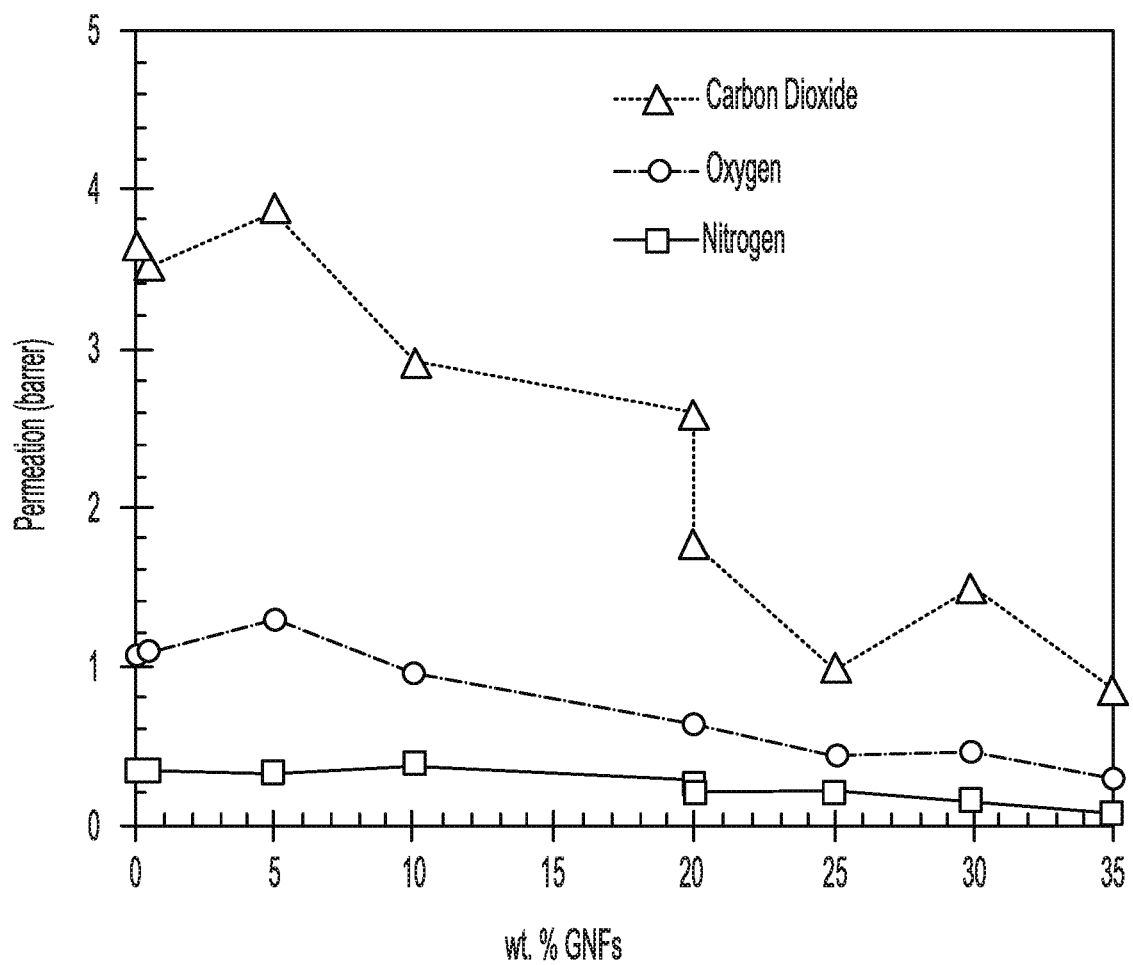
Figure 15A:
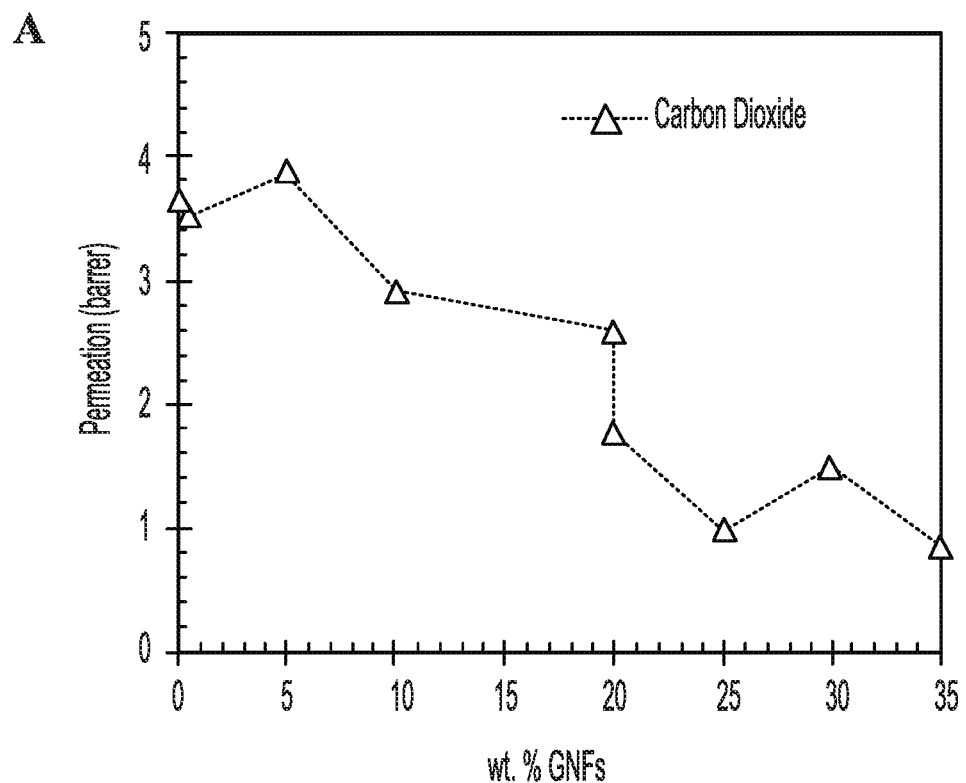
FIGS. 15A, 15B, and 15C show permeation as a function of GNF concentration in HDPE nanocomposite films with 0, 0.5, 5, 10, 20, 25, 30, and 35 wt % GNFs after 90-minute melt-mixing of carbon dioxide (FIG. 15A), oxygen (FIG. 15B), and nitrogen (FIG. 15C).
Figure 15B:
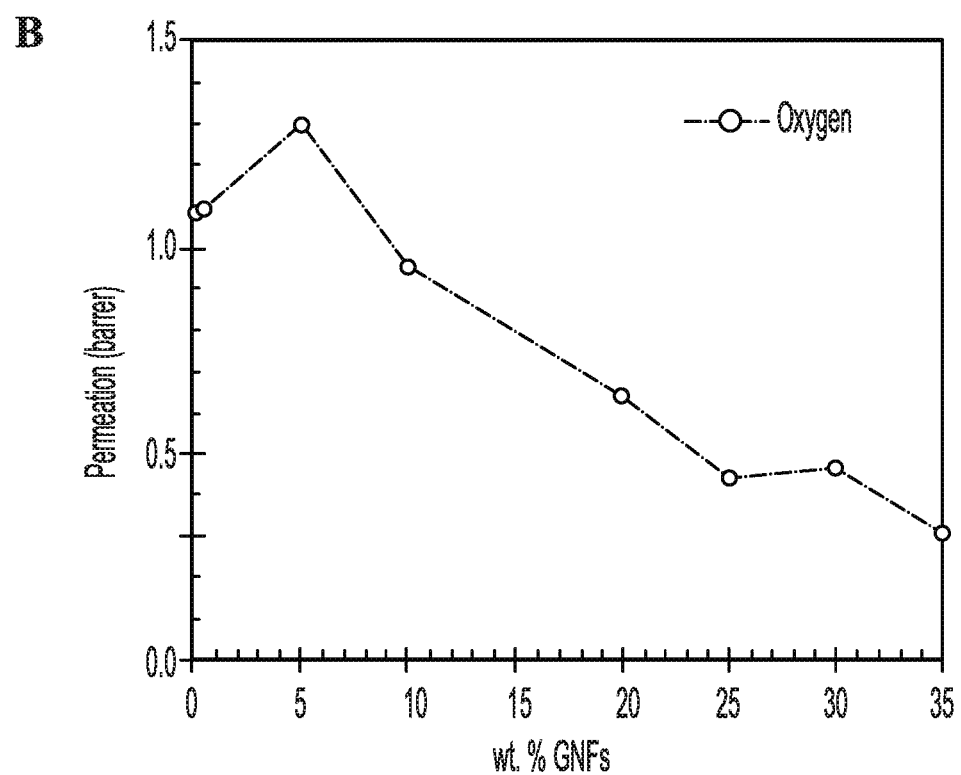
Figure 15C:
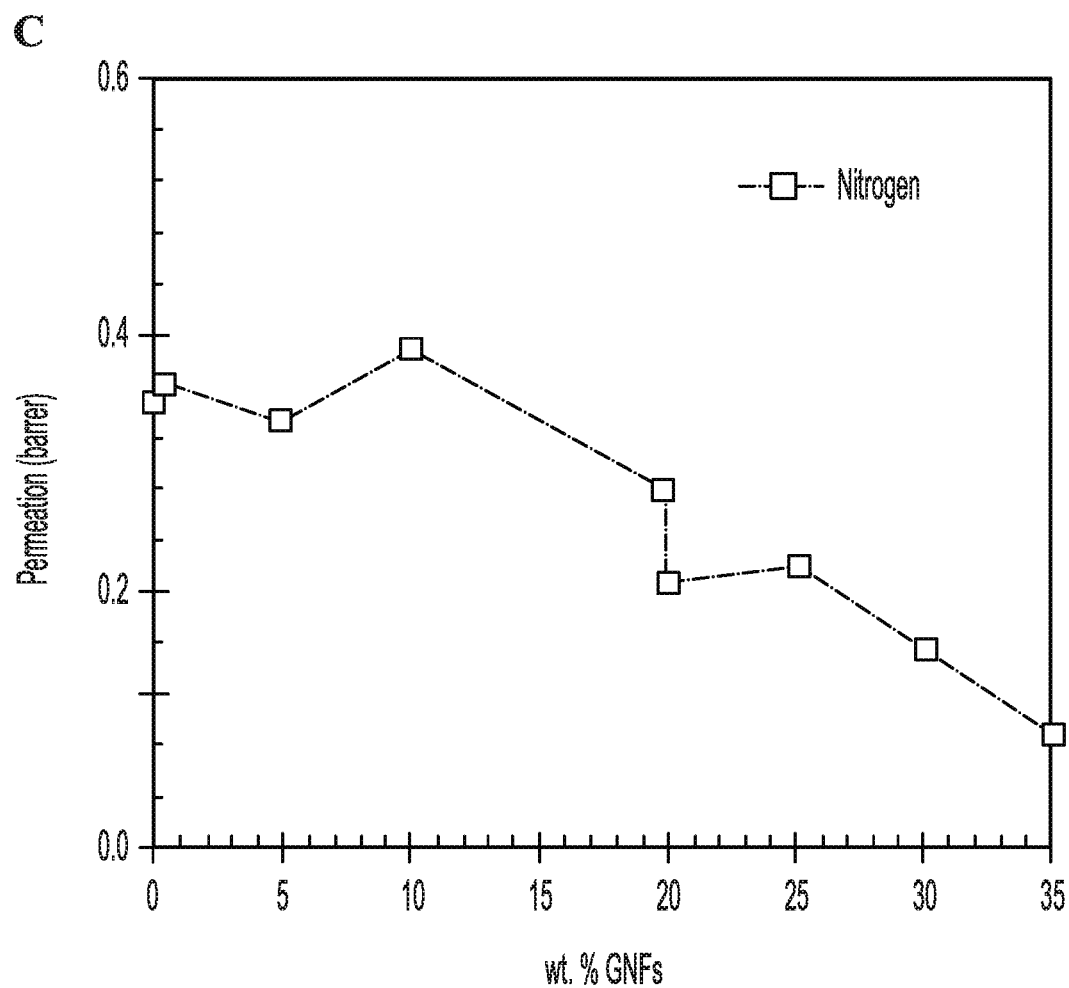

Permeation as a function of GNF concentration for oxygen, nitrogen, and carbon dioxide permeation through G-HDPE films with 0, 0.5, 5, 10, 20, 25, 30, and 35 wt % GNFs and after melt-mixing for 90 minutes are shown graphically in FIG. 14C and tabulated in Table 1. The addition of GNFs to HDPE reduced the permeation of these small gases through the G-HDPE nanocomposite films. For 35G-HDPE films, the permeation of oxygen, nitrogen, and carbon dioxide decreased by 72, 75, and 76%, respectively, as compared with HDPE films. In FIG. 15, permeation of each gas as a function of GNF concentration is shown for convenience and optimum axis scales, for (A) carbon dioxide, (B) oxygen, and (C) nitrogen.

TABLE 1

Nitrogen, oxygen, and carbon dioxide permeation through G-HDPE nanocomposite films with 0, 0.5, 5, 10, 20, 25, 30, and 35 wt % GNFs after 90-minute melt-mixing.

| % Graphite | Ave Film Thickness (μm) | Oxygen Permeation (barrer) | % Change | Nitrogen Permeation (barrer) | % Change | Carbon Dioxide Permeation (barrer) | % Change |
|---|---|---|---|---|---|---|---|
| 0    | 75  | 1.08 | 0    | 0.35 | 0   | 3.66 | 0    |
| 0.5  | 98  | 1.09 | 0.96 | 0.36 | 5   | 3.53 | −3.5 |
| 5    | 98  | 1.30 | 20   | 0.33 | −4  | 3.88 | 6    |
| 10   | 165 | 0.95 | −12  | 0.39 | 12  | 2.91 | −20  |
| 20   | 98  | Not tested | | 0.28 | −19 | 2.59 | −29  |
| 20   | 132 | 0.64 | −41  | 0.21 | −40 | 1.78 | −51  |
| 25   | 91  | 0.44 | −59  | 0.22 | −36 | 0.97 | −73  |
| 30   | 132 | 0.47 | −57  | 0.15 | −55 | 1.51 | −59  |
| 35   | 132 | 0.30 | −72  | 0.09 | −75 | 0.86 | −76  |

Nitrogen, oxygen, and carbon dioxide permeation through G-HDPE films with 0, 0.5, 5, 10, 20, 25, 30, and 35 wt % GNFs was determined using a constant volume apparatus at a temperature of 35° C. Films were mounted on flat brass rings with inner areas of 1.68 cm$^2$ or 2.84 cm$^2$ (depending on the thickness variance of the films) using Devcon 5-minute epoxy and sealed inside the apparatus on top of a porous metal base. The samples were degassed overnight. During the test, a vacuum is drawn downstream of the sample and then isolated except for the sample interface. The test gas enters upstream at 1-2.5 atm. This pressure differential causes gas to diffuse through the sample, and the measured change in the downstream pressure is used to calculate permeability using [EQ 1]. Each film was exposed to nitrogen, oxygen, and carbon dioxide, with approximately 1 hour of degassing between each exposure. The downstream pressure was recorded at 1-second intervals during the experiment using a python script. The time span needed to achieve linear pressure increase was monitored, and the experiments were run for approximately 5 times this span.

$$P = \frac{V}{RTA} \cdot \frac{l}{\Delta p} \cdot \left( \frac{dp_d}{dt_{exp.}} - \frac{dp_d}{dt_{leak}} \right) \quad [\text{EQ 1}]$$

Where:
V=volume of the apparatus
l=sample thickness
A=sample area
Δp=pressure differential across the sample
dp/dt (exp.)=measured rate of change of the downstream pressure during the experiment
dp/dt (leak)=downstream leak rate of the apparatus measured before the experiment The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

To aid in understanding the detailed description of the compositions and methods according to the disclosure, a few express definitions are provided to facilitate an unambiguous disclosure of the various aspects of the disclosure.

Unless otherwise defined, all technical and scientific terms used herein have the same meaning as commonly understood by one of ordinary skill in the art to which this disclosure belongs.

It is noted here that, as used in this specification and the appended claims, the singular forms "a," "an," and "the" include plural reference unless the context clearly dictates otherwise. The terms "including," "comprising," "containing," or "having" and variations thereof are meant to encompass the items listed thereafter and equivalents thereof as well as additional subject matter unless otherwise noted.

Other objects, features, and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

We claim:

1. A packaging material comprising a graphene-reinforced thermoplastic polymer matrix composite, wherein the graphene-reinforced polymer matrix composite comprises from about 2 wt % to about 60 wt % of particles selected from the group consisting of mechanically exfoliated single-layer and multi-layer graphene nanoparticles less than 10 nanometers thick along the c-axis direction, partially exfoliated multi-layer graphene nanoparticles of thickness greater than 10 nanometers and less than 1,000 nanometers along the c-axis direction, graphite microparticles, and combinations of two or more thereof, wherein from about 5 wt % to about 95 wt % of the particles are mechanically exfoliated single-layer graphene nanoparticles less than 10 nanometers thick along the c-axis direction, mechanically exfoliated multi-layer graphene nanoparticles less than 10 nanometers thick along the c-axis direction, partially exfoliated multi-layer graphene nanoparticles of thickness greater than 10 nanometers and less than 1,000 nanometers along the c-axis direction, or a combination of two or more thereof.

2. The packaging material of claim 1, wherein the graphene-reinforced polymer matrix composite comprises between about 1 wt % and about 50 wt % of graphene nanoparticles.

3. The packaging material of claim 1, wherein the graphene-reinforced polymer matrix composite comprises between about 0.1 wt % and about 30 wt % of graphene nanoparticles.

4. The packaging material of claim 1, wherein the graphene-reinforced polymer matrix composite comprises from about 5% to about 55% of a total composite weight of the particles.

5. The packaging material of claim 1, wherein the graphene-reinforced polymer matrix composite comprises a thermoplastic polymer selected from the group consisting of acrylics, polymethyl-methacrylate (PMMA), acrylonitrile, acrylonitrile butadiene styrene (ABS) co-polymers, polyacrylate, polyacrylonitriles (PAN), polyamideimide (PAI), aromatic polysulfones, aromatic thermoplastic polyesters, liquid crystal polymers, polyarylether-ketones, polycarbonates (PC), polydimethyl siloxane (PDMS), polyaryletherketones (PAEK), polyetherether-ketones (PEEK), polyethylene naphthalene dicarboxylate (PEN), polyetherimides (PEI), polyetherketones (PEK), polyethylene, Polyethersulfone, polysulphone (PSul), polyethylene sulfide (PES), polyethylene terephthalate (PET or PETE), low-density polyethylene (LDPE), high-density polyethylene (HDPE), polyglycolic acid (PGA), polylactic acids (PLA), polylacticglycolic acid copolymers (PLGA), polyoxymethylene plastic (POM/Acetal), polyphenylene ethers, polyphenylene oxide (PPO), polyphenylene sulfides (PPS), polypropylene (PP), polystyrene (PS), polysulfones (PSU), polytetrafluoroethylene (PTFE/TEFLON®), polyvinylchloride (PVC), polyvinylidene fluoride (PVDF), thermoplastic elastomers, polyimides, thermosplastic polyimides, ultra-highmolecular weight polyethylene (UHMWPE), natural or synthetic rubber, Polyamides (PA), nylons, aliphatic polyamides, semi-aromatic polyamides, aromatic polyamides, polyamide-11 (nylon-11), polyamide-12 (nylon-12), polyamide-4,6, polyamide-6 (nylon-6), polyamide-6, 10, polyamide-6, 12, polyamide-6,6 (nylon-6,6), polyamide-6,9, polyamides (PA), and the mixtures of two or more thereof.

6. The packaging material of claim 5, wherein the thermoplastic polymer is inter-molecularly cross-linked to torn single- and/or multi-layer graphene sheets having carbon atoms with reactive bonding sites on the torn edges of the sheets.

7. The packaging material of claim 1 wherein the graphene reinforced polymer matrix comprises at least one mechanically exfoliated single- and/or multi-layer graphene nanoparticle bound to one or more polymer molecules.

8. The packaging material of claim 1, wherein the graphene-reinforced polymer matrix comprises at least one thermoplastic polymer molecule bonded or adhered to one or more mechanically exfoliated single- or multi-layer graphene nanoparticles.

9. The packaging material of claim 1, wherein the graphene-reinforced polymer matrix composite is prepared by:
(a) distributing graphite microparticles into a molten thermoplastic polymer phase, wherein at least 50 wt % of the graphite in the graphite microparticles consists of multi-layer graphite crystals between 1.0 and 1000 microns thick along the c-axis direction; and
(b) applying a succession of shear strain events to the molten polymer phase so that the shear stress within the molten polymer phase is equal to or greater than the Interlayer Shear Strength (ISS) of the graphite microparticles and the molten polymer phase mechanically exfoliates the graphite successively with each event until the graphite is at least partially exfoliated to form a distribution in the molten polymer phase of single- and multi-layer graphene nanoparticles less than 10 nanometers thick along the c-axis direction.

10. The packaging material of claim 1, comprising one or more layers of the graphene-reinforced polymer matrix composite.

11. The packaging material of claim 10, further comprising one or more layers of material comprising paper, plastic, metal, foil, flexible ceramic material, or a combination thereof.

* * * * *